(12) United States Patent
Onodera et al.

(10) Patent No.: US 7,849,066 B2
(45) Date of Patent: Dec. 7, 2010

(54) APPARATUS AND METHOD FOR DETERMINING ADEQUACY OF INFORMATION RETRIEVING PROCESS

(75) Inventors: Sachiko Onodera, Kawasaki (JP); Isao Namba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 207 days.

(21) Appl. No.: 11/412,953

(22) Filed: Apr. 28, 2006

(65) Prior Publication Data
US 2007/0168337 A1 Jul. 19, 2007

(30) Foreign Application Priority Data
Jan. 18, 2006 (JP) .............................. 2006-009747

(51) Int. Cl.
*G06F 7/08* (2006.01)

(52) U.S. Cl. .................. 707/706; 707/722; 379/265.03; 379/265.06

(58) Field of Classification Search .................. 707/706
See application file for complete search history.

(56) References Cited

U.S. PATENT DOCUMENTS

| | | | |
|---|---|---|---|
| 4,775,956 A * | 10/1988 | Kaji et al. ...................... 704/7 |
| 5,307,266 A * | 4/1994 | Hayashi et al. ............. 715/201 |
| 5,802,493 A * | 9/1998 | Sheflott et al. .................. 705/1 |
| 5,825,869 A * | 10/1998 | Brooks et al. .......... 379/265.12 |
| 5,982,857 A * | 11/1999 | Brady ..................... 379/88.19 |
| 6,094,649 A * | 7/2000 | Bowen et al. .................. 707/3 |
| 6,175,828 B1 * | 1/2001 | Kuromusha et al. ............ 707/3 |
| 6,346,952 B1 * | 2/2002 | Shtivelman ................. 715/758 |
| 6,459,787 B2 * | 10/2002 | McIllwaine et al. ..... 379/265.06 |
| 6,509,914 B1 * | 1/2003 | Babula et al. ............... 715/762 |
| 6,510,414 B1 * | 1/2003 | Chaves ..................... 704/270 |
| 6,648,760 B1 * | 11/2003 | Nicastro ..................... 463/23 |
| 6,671,670 B2 * | 12/2003 | Levin et al. .................. 704/270 |
| 6,711,253 B1 * | 3/2004 | Prabhaker .............. 379/265.01 |
| 7,054,860 B2 * | 5/2006 | Inaba et al. ......................... 1/1 |
| 7,099,456 B2 * | 8/2006 | Zama ..................... 379/265.13 |
| 7,103,553 B2 * | 9/2006 | Applebaum et al. ......... 704/275 |
| 7,200,614 B2 * | 4/2007 | Reid et al. ............... 707/104.1 |
| 7,295,957 B2 * | 11/2007 | Pulfer ............................ 703/6 |
| 7,460,659 B2 * | 12/2008 | Shambaugh et al. ... 379/265.02 |
| 2003/0061071 A1 * | 3/2003 | Babula et al. .................. 705/2 |
| 2004/0062381 A1 * | 4/2004 | Shambaugh et al. ... 379/265.02 |
| 2004/0068495 A1 * | 4/2004 | Inaba et al. ..................... 707/3 |
| 2004/0233056 A1 * | 11/2004 | Pulfer ..................... 340/568.2 |
| 2005/0201546 A1 * | 9/2005 | Yanase et al. .......... 379/265.12 |
| 2005/0213743 A1 * | 9/2005 | Huet et al. ............. 379/265.09 |

* cited by examiner

FOREIGN PATENT DOCUMENTS

JP 2005-258551 9/2005

*Primary Examiner*—Hung Q Pham
*Assistant Examiner*—Hubert Cheung
(74) *Attorney, Agent, or Firm*—Staas & Halsey LLP

(57) ABSTRACT

The apparatus acquires retrieval history data of information retrieval to be determined, and acquires voice data of the conversation heard about information necessary for the information retrieval. A predetermined keyword dictionary is referred to from the voice data, and an expression matching a keyword indicating necessary information for information retrieval is extracted, and defined as a keyword obtained before retrieval. Then, the keyword obtained before retrieval and the retrieval history data (a retrieval key, a selected document, and an order in the retrieval result of the selected document) are compared with the best case data accumulated in the best case data storage unit, the applicability of the keyword obtained before retrieval and the applicability of the retrieval key are determined, and the applicability of the information retrieving process is obtained based on the determination.

14 Claims, 27 Drawing Sheets

FIG. 3C

BEST CASE DATA STORAGE UNIT

| CASE ID : KEYWORD | : BEST RETRIEVAL KEY : | BEST ORDER OF SELECTED DOCUMENT | : SELECTED DOCUMENT ID |
|---|---|---|---|
| 0901 : DIFFERENT TONE, FAINT | : DIFFERENT TONE, FAINT | : 20 | : x |
| 0902 : DIFFERENT TONE, BLACK, XL-6300 | : DIFFERENT TONE, BLACK, LASER PRINTER | : 5 | : x |
| 0903 : DIFFERENT TONE, BLACK, LEFT, FAINT | : DIFFERENT TONE, BLACK, LEFT | : 2 | : x |

```
RETRIEVAL EXECUTION OPERATOR ID : FJ11
RETRIEVAL TIME : 03:07
RETRIEVAL KEY : "DIFFERENT TONE", "BLACK"
SELECTION TARGET DOCUMENT ID : 035
RETRIEVAL RESULT ORDER : 7
```

EXPRESSION RULE: RETRIEVAL KEY → CANDIDATE FOR READ OF
KEYWORD DICTIONARY

RULE: X (NOUN, COLOR)→ R ...ISH, ...Y, ...LIKE, TRUE ...
RULE: "0" →R CIRCLE, ZERO, O
RULE: · · · · ·
RULE:

FIG.16A

RETRIEVAL HISTORY DATA

RETRIEVAL TIME: 03:07  ～30
RETRIEVAL KEY: "A012", "BLACK"
SELECTION TARGET DOCUMENT ID: 035
RETRIEVAL RESULT ORDER: 7

REGISTRATION IN DICTIONARY ⬅ APPLY EXPRESSION RULE

KEYWORD DICTIONARY  ～106

OUTPUT: CANDIDATE FOR READ

· · · · ·

BLACK: BLACKISH, BLACK, SOMEWHAT BLACK, DEEP BLACK
A012 : A012, AO12, A;12

| RECOGNITION RESULT: | PROBABILITY |
|---|---|
| DIFFERENT TONE: | 0.86 |
| BLACK : | 0.75 |
| FAINT : | 0.71 |
| LEFT : | 0.82 |
| BLOT : | 0.54 |
| CREAKY : | 0.67 |

FIG.18

LOGICAL SUM OF EXPRESSIONS:
"DIFFERENT TONE", "BLACK", "FAINT", "LEFT"

FIG.19A

LIST OF COMBINATIONS:

0 : DIFFERENT TONE
1 : BLACK
2 : FAINT
3 : LEFT
4 : DIFFERENT TONE, BLACK
5 : DIFFERENT TONE, FAINT
6 : DIFFERENT TONE, LEFT
7 : BLACK, FAINT
8 : BLACK, LEFT
9 : FAINT, LEFT
10 : DIFFERENT TONE, BLACK, FAINT
11 : DIFFERENT TONE, BLACK, LEFT
12 : DIFFERENT TONE, FAINT, LEFT
13 : BLACK, FAINT, LEFT
14 : DIFFERENT TONE, BLACK, FAINT, LEFT

FIG.19B

BEST CASE DATA STORAGE UNIT

| CASE ID : | KEYWORD | : BEST RETRIEVAL KEY : | BEST ORDER OF SELECTED DOCUMENT | : SELECTED DOCUMENT ID |
|---|---|---|---|---|
| 0901 : | DIFFERENT TONE, FAINT | : DIFFERENT TONE, FAINT | : 20 | : x |
| 0902 : | DIFFERENT TONE, BLACK, XL-6300 | : DIFFERENT TONE, BLACK, LASER PRINTER | : 5 | : x |
| 0903 : | DIFFERENT TONE, BLACK, LEFT, FAINT | : DIFFERENT TONE, BLACK, LEFT | : 8 | : x |

FIG.20

RETRIEVAL EXECUTION OPERATOR ID: FJ11

RETRIEVING OPERATION[0]:
   RETRIEVAL TIME: 03:07
   RETRIEVAL KEY: "DIFFERENT TONE" "BLACK"
   SELECTION TARGET DOCUMENT ID: -
   RETRIEVAL RESULT ORDER: -

RETRIEVING OPERATION[1]:
   RETRIEVAL TIME: 03:48
   RETRIEVAL KEY: "DIFFERENT TONE", "BLACK", AND "LEFT"
   SELECTION TARGET DOCUMENT ID: 035
   RETRIEVAL RESULT ORDER: 7

FIG.22

APPARATUS AND METHOD FOR DETERMINING ADEQUACY OF INFORMATION RETRIEVING PROCESS

CROSS-REFERENCE TO RELATED APPLICATIONS

This application claims priority from Japanese patent application Serial number 2006-009747 filed Jan. 18, 2006, the contents of which are incorporated by reference herein.

BACKGROUND OF THE INVENTION

1. Field of the Invention

The present invention relates to an information retrieval applicability determining technique for determining the applicability of the information retrieving process and the like, which are performed by an operator in a call center for example, a best case generating technique for generating the best execution case (hereinafter referred to as a best case data) of an information retrieving process which is a standard of the applicability determination of the information retrieving process, and an information retrieval support technique of an operator using the best case.

The information retrieval applicability determining technique according to the present invention can be applied to a determination of the information retrieval skill of an operator using the applicability of the information retrieving process.

2. Description of the Related Art

The operator who is in charge of the processes in a call center is evaluated about the client correspondence skill including the communication capability, the problem solving capability or the like. The method of estimating the client correspondence skill of an operator has conventionally been estimating the corresponding time for a problem using time information for each corresponding sequence in the client correspondence as in, for example, the business skill estimation device of the patent document 1(Patent Document 1: Japanese Patent Laid-open Number 2005-258551), and estimating the client correspondence skill of an operator based on the estimated corresponding time.

In the operator processes, various information retrieving processes such as the client retrieving process for displaying client information during client correspondence, the case retrieving process for appropriately answering the inquiries of clients are performed. Therefore, when the client correspondence skill of an operator is evaluated, it is specifically important to measure the information retrieval skill.

Conventionally, the information retrieval skill of an operator is determined using the time required in information retrieval, the relationship between an input retrieval key and a selected retrieval result.

To more correctly determine the applicability of the information retrieving process performed in the call center, it is not sufficient only to determine it based on the length of the time required to perform an information retrieving process, the relationship between the retrieval key and the retrieval result.

Therefore, when information is retrieved, it is requested to realize the process of determining the applicability of the information retrieving process by considering whether or not an appropriate retrieval key has been input in the first place, and whether or not the information required for the information retrieving process has been obtained from a client before the retrieval.

However, there has been no method or apparatus of determining the applicability of the retrieval key itself for information retrieval and the applicability of the information retrieving process from the point of view of whether or not necessary information has been appropriately obtained for the information retrieving process. Therefore, it has not been easy to determine the information retrieval skill of an operator in the call center with high accuracy.

Furthermore, the retrieval history information about the information retrieving process accumulated in the call center includes the information about a retrieval key, a retrieval time, a retrieval result and the like, and is used in improving the performance of the retrieval processing device and the system improvement such as the adjustment of data of a database. However, the retrieval history information has not conventionally been used in evaluating the skill of an operator, supporting the information retrieving process of an operator, etc., and information has not been fully utilized.

SUMMARY OF THE INVENTION

The object of the present invention is to provide an apparatus for determining an applicability of an information retrieving process based on the applicability of the information (for example, a keyword obtained before retrieval) acquired before the information retrieving process, and the applicability of the retrieval key used in the information retrieving process.

Another object of the present invention is to provide an apparatus for determining the information retrieval skill of an operator based on the applicability of the information (for example, a keyword obtained before retrieval) about the necessary information for the information retrieving process obtained by the operator from a client, and the applicability of the retrieval key used in the information retrieving process.

A further object of the present invention is to provide an apparatus for generating best case data indicating the best execution example of the information retrieving process used as a determination criteria in the information retrieval applicability determining process and the operator skill determining process.

A further object of the present invention is to provide an apparatus for presenting a candidate for a retrieval key considered the best in the case of the keyword obtained before retrieval acquired by an operator from a client using the best case data.

The present invention is an apparatus having the following processing units to determine the applicability of an information retrieving process. The apparatus includes: a storage unit for storing a keyword indicating necessary information for an information retrieving process; a storage unit for storing best case data including a keyword indicating information about a best execution example of an information retrieving process and necessary information for the information retrieving process acquired before the information retrieving process, a retrieval key used in the information retrieving process, a selected document indicating a document selected from among retrieval results, and an order of the selected documents in the retrieval results; a unit for acquiring voice data in which a conversation including necessary information about an information retrieving process to be determined is recorded; a unit for acquiring retrieval history data including a retrieval key used in the information retrieving process to be determined, a selected document indicating a document selected from among retrieval results, and an order of the selected documents in the retrieval results; a unit for extracting information obtained before retrieval for extracting an expression matching a keyword in the keyword storage unit from the voice data, and defining the extracted expression as the keyword obtained before retrieval; and a unit for extracting best case data having a keyword matching the keyword obtained before retrieval from the best case storage unit, determining the applicability of the keyword obtained before retrieval in the information retrieving process to be determined based on the extracted best case data and the applicability of the retrieval history data, and obtaining the applicability of the information retrieving process based on the applicability of the keyword obtained before retrieval and the applicability of the retrieval history data.

In the present invention, when the applicability of the information retrieving process is determined, the voice data of the portion of the information necessary to perform the information retrieving process in the voice data of recorded conversation between an operator and a client recorded in, for example, in a call center, etc., and the retrieval history data of the information retrieving process performed by the operator are used.

The apparatus according to the present invention acquires voice data in which a conversation including necessary information about the information retrieving process to be determined is recorded and also acquires the retrieval history data including a retrieval key used in the information retrieving process to be determined, a selected document indicating a document selected from retrieval results, and the order of the selected document in the retrieval results. The apparatus extracts an expression matching the keyword in the keyword storage unit from the acquired voice data based on the storage unit storing the keyword indicating the necessary information for the information retrieving process, and defines the extracted expression as a keyword obtained before retrieval.

Then the apparatus extracts the best case data having a keyword matching the keyword obtained before retrieval from the best case storage unit, and determines the applicability of the keyword obtained before retrieval of the information retrieving process to be determined and the applicability of the retrieval history data based on the extracted best case data.

For example, the apparatus acquires, from the best case data storage unit, the best case data having a keyword matching the keyword obtained before retrieval and also having the same selected document, and performs a process of determining the applicability of the retrieval key of the retrieval history data based on the retrieval key of the acquired best case data. The apparatus has a keyword matching the keyword obtained before retrieval in the best case data storage unit, and when there is no best case data containing the same selected document, acquires the best case data having the same selected document and determines the applicability of the keyword obtained before retrieval which is extracted from the voice data based on the keyword of the obtained best case data. Thus, the applicability of the information retrieving process can be more correctly determined with not only a retrieval key for information retrieval but also information necessary to select a retrieval key to be used taken into account.

Furthermore, the apparatus according to the present invention can obtain the information retrieval skill of the operator who performs the information retrieving process based on the applicability of the keyword obtained before retrieval and the applicability of the retrieval history data. Thus, the information retrieval skill of an operator can be more correctly determined from the aspect of the selection capability of a retrieval key and the acquisition capability of necessary information to select a retrieval key.

Furthermore, the present invention further comprises a unit for generating best case data based on the keyword obtained before retrieval and the retrieval key of the retrieval history data, the selected document indicating the document selected from the retrieval result, and the order in the retrieval result of the selected document, and registering the data in the best case data storage unit.

In this case, the apparatus acquires the voice data in which a conversation including necessary information about the information retrieving process is recorded. The apparatus also acquires retrieval history data including a retrieval key used in the information retrieving process, a selected document indicating the document selected from a retrieval result, and the order in the retrieval result of the selected document. Then, the apparatus extracts an expression matching the keyword of the keyword storage unit from voice data, and defines the extracted expression as a keyword obtained before retrieval. The apparatus generates best case data based on the keyword obtained before retrieval and the retrieval key of the retrieval history data, the selected document indicating the document selected from the retrieval result, and the order in the retrieval result of the selected document, and registers the data in the best case data storage unit. Thus, the best case data for use as the description criteria in the determining process of the applicability of the information retrieving process and the determining process of the information retrieval skill of an operator can be automatically generated and accumulated.

According to the present invention, the applicability of the information retrieving process can be determined based on the applicability of the retrieval key and the applicability of the information as the keyword obtained before the information retrieving process for input of a retrieval key. Therefore, the determination of the information retrieval of hearing and retrieving information can be performed with higher precision than the conventional technology.

Also according to the present invention, since the skill determination on an operator in the information retrieving process can be performed based on the determining process on the applicability in the information retrieving process, an operator information retrieval skill determining process can be realized with higher precision than in the conventional technology.

Furthermore, according to the present invention, best case data relating to the best extraction example of the information retrieving process can be generated using the history information about the information retrieving process accumulated in a call center and voice data, and a high-accuracy information retrieval applicability determining process and operator skill determining process can be realized.

BRIEF DESCRIPTION OF THE DRAWINGS

FIG. 3A, 3B and 3C are an explanatory view of the best case data generating and accumulating process;

FIG. 16A and 16B are an explanatory view of registering in a keyword dictionary;

FIG. 18 shows an example of a result of the word spotting process;

FIG. 19A and 19B show an example of a combination of retrieval keys;

FIG. 20 shows an example of a generated best case data storage unit;

FIG. 22 shows an example of acquired retrieval history data;

DETAILED DESCRIPTION OF THE PREFERRED EMBODIMENTS

Figure 1:
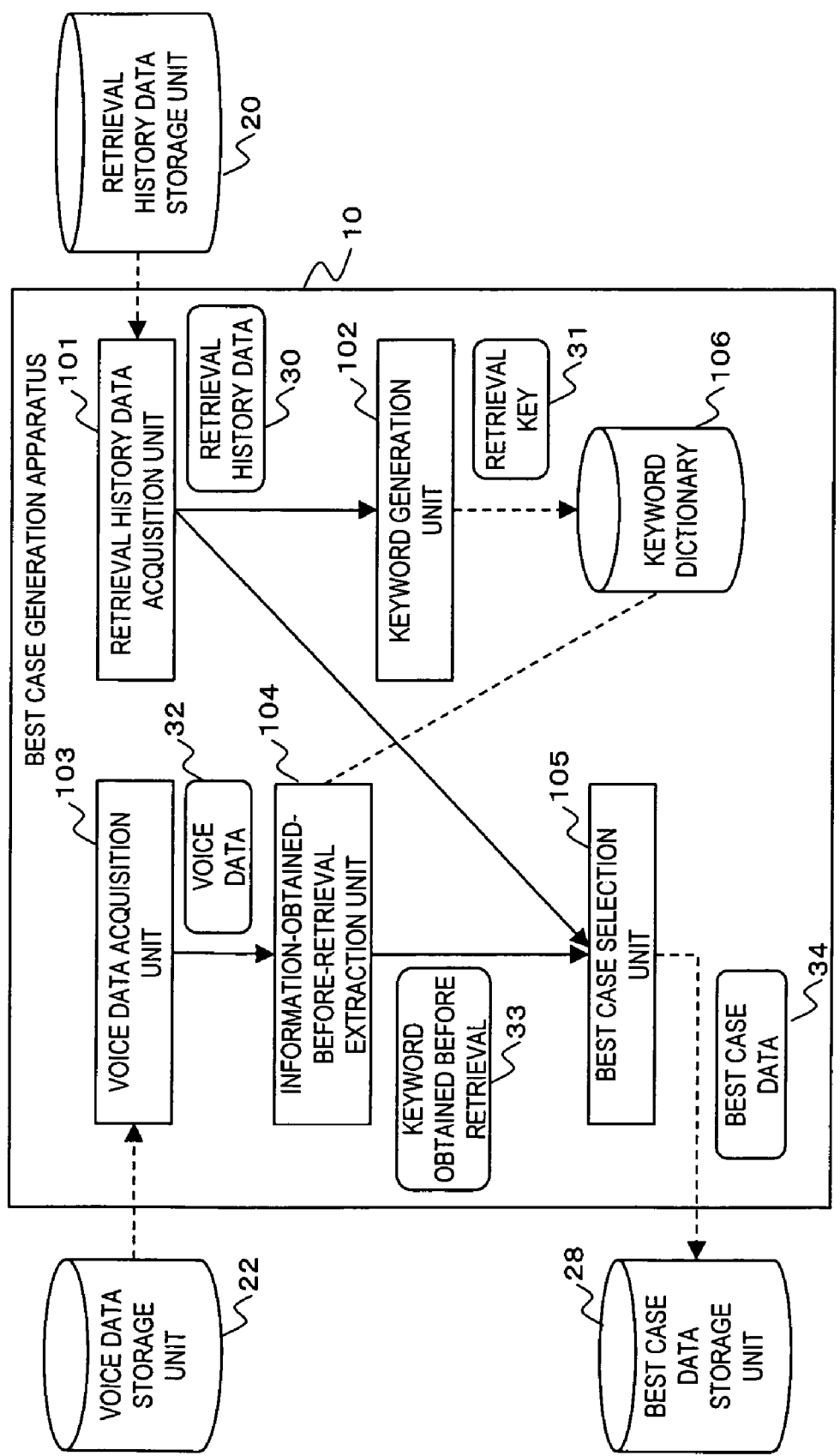
FIG. 1 shows an example of the configuration of a best case generation apparatus for generating and accumulating best case data.

The principle of the present invention is explained below. In the present invention, voice data in which a conversation including necessary information about the information retrieving process to be determined is recorded is acquired. Furthermore, the retrieval history data including the retrieval key used in the information retrieving process to be determined, the selected document indicating the document selected from the retrieval result, and the order in the retrieval result of the selected document is acquired. Based on the keyword storage unit storing a keyword indicating the necessary information in the information retrieving process, an expression matching the keyword in the keyword storage unit is extracted from the acquired voice data, and is defined as a keyword obtained before retrieval.

Furthermore, the best case data having a keyword matching the keyword obtained before retrieval is extracted from the best case storage unit, and the applicability of the keyword obtained before retrieval and the applicability of the retrieval history data in the information retrieving process to be determined are determined based on the extracted best case data. Based on the applicability of the keyword obtained before retrieval and the applicability of the retrieval history data, the applicability of the information retrieving process is obtained.

Otherwise, the information retrieval skill of an operator who has performed the information retrieving process is obtained based on the applicability of the keyword obtained before retrieval and the applicability of the retrieval history data.

Furthermore, the best case data having a keyword matching the keyword obtained before retrieval is extracted from the best case storage unit, and the retrieval key of the best case data which is the best retrieval result about the selected document is extracted, and the extracted retrieval key is presented as a candidate for the best retrieval key to the operator who performs an information retrieving process.

The best mode for embodying the present invention is explained below by referring to the drawings.

[Best Case Data Generating And Accumulating Process]

The best case data generating and accumulating process generates and accumulates the best case data for the information retrieval as determination criteria in the determining process of the applicability of the information retrieval and operator skill.

FIG. 1 shows an example of the configuration of a best case generation apparatus 10 for generating and accumulating the best case data. The best case generation apparatus 10 includes a retrieval history data storage unit 20, a voice data storage unit 22, a best case data storage unit 28, a retrieval history data acquisition unit 101, a keyword generation unit 102, a voice data acquisition unit 103, an information-obtained-before-retrieval extraction unit 104, a best case selection unit 105, and a keyword dictionary 106.

The retrieval history data storage unit 20 is storage means for storing the retrieval history data 30 including the history information about the performed information retrieving process, a retrieval key used in the information retrieving process, the selected document (document ID) indicating the document selected from a retrieval result and the order in the retrieval result of the selected document.

The voice data storage unit 22 is storage means for storing voice data 32 in which a conversation including necessary information for an information retrieving process such as voice data as recorded conversation between an operator and a client, or the voice data 32 of the portion (hereinafter referred to as a heard portion) heard about the necessary information for information retrieval from the voice data.

The best case data storage unit 28 stores a best case data 34 including The best case data 34 which relates to information for the information retrieving process from which the best retrieval result is obtained, and includes a keyword indicating the necessary information acquired before the information retrieving process, a retrieval key used in the information retrieving process, a document ID (x) of the document selected from the retrieval result, and the best order in the retrieval result of the selected document x.

The retrieval history data acquisition unit 101 is processing means for acquiring retrieval history data 30 from the retrieval history data storage unit 20. The keyword generation unit 102 is processing means for registering a word, an expression, a phrase, etc. used as a retrieval key of the retrieval history data 30 as a keyword in the keyword dictionary 106.

The voice data acquisition unit 103 is processing means for acquiring the voice data 32 from the voice data storage unit 22.

The information-obtained-before-retrieval extraction unit 104 is processing means for extracting an expression and a phrase matching a keyword from the voice data 32 in the voice recognizing process using a keyword registered in the keyword dictionary 106, and defining the extracted expression, etc. as a information obtained before retrieval (hereinafter referred to as a keyword 33 obtained before retrieval).

The best case selection unit 105 is processing means for generating the best case data 34 according to the information about the keyword 33 obtained before retrieval and the retrieval history data 30, and accumulating the data in the best case data storage unit 28.

Figure 2:
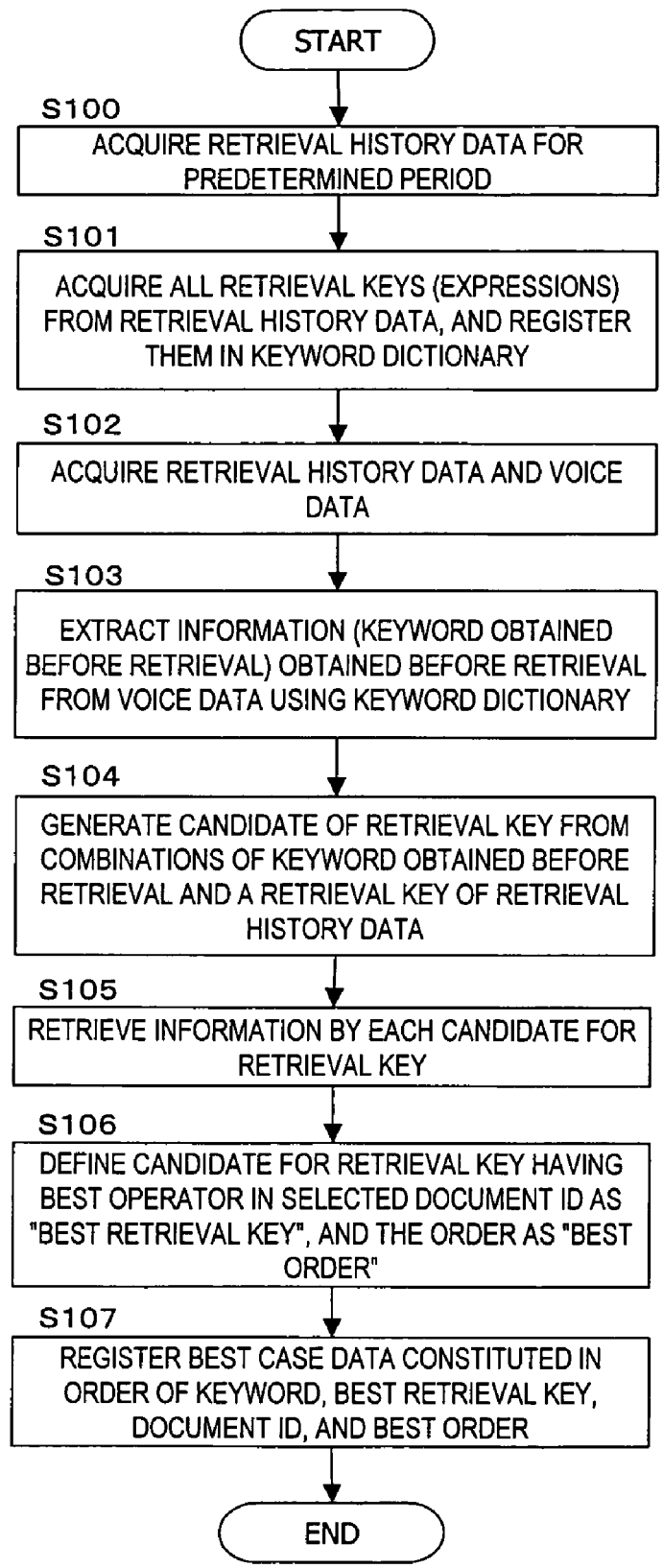
FIG. 2 shows a process flow of the best case data generating and accumulating process.

FIG. 2 shows a process flowchart of the best case data generating and accumulating process. The retrieval history data acquisition unit 101 sequentially acquires the retrieval history data 30 in a predetermined past period (step S100), acquires all expressions of the retrieval keys of the retrieval history data 30, and registers them in the keyword dictionary 106 (step S101).

The retrieval history data acquisition unit 101 acquires the retrieval history data 30 from the retrieval history data storage unit 20. The voice data acquisition unit 103 acquires the voice data 32 corresponding to the retrieval history data 30 from the voice data storage unit 22 (step S102).

Figure 3A:
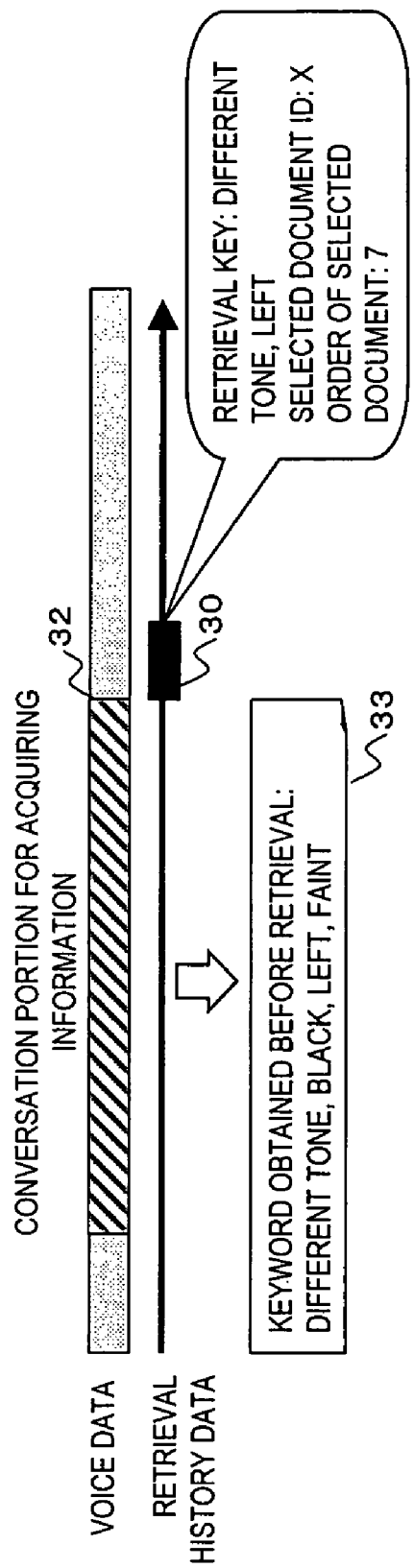

The information-obtained-before-retrieval extraction unit 104 performs the voice recognizing process on the obtained voice data 32 using the keyword dictionary 106, extracts the expression matching the keyword registered in the keyword dictionary 106, and defines the extracted expression as the keyword 33 obtained before retrieval (step S103). For example, as shown in FIG. 3 A, in the retrieval history data 30 acquired in step S102, when the retrieval key="different tone, left", the selected document ID=x, and the order of the selected document=7, the keyword 33 obtained before retrieval extracted in step S103 is "different tone, black, left, faint".

Figure 3B:
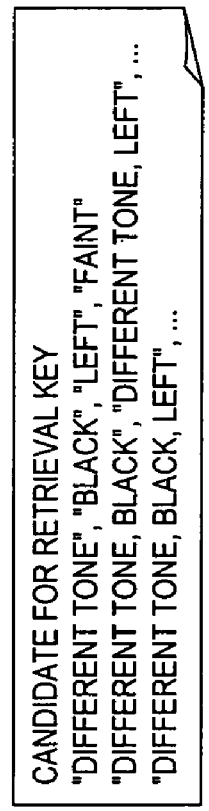

The best case selection unit 105 generates all combinations of expressions of a sum of the extracted keyword 33 obtained before retrieval and the retrieval key of the retrieval history data 30 obtained in step S102, and generates a candidate for a retrieval key based on all combinations (step S104). Practically, from the expression "different tone, black, left, faint" of the logical sum of the retrieval key="different tone, left" of the retrieval history data 30 and the "different tone, black, left, faint" of the keyword 33 obtained before retrieval, candidates for a retrieval key such as "different tone", "black", "left", "faint", "different tone, black", "different tone, left", . . . , "different tone, black, left", etc. are generated as shown in FIG. 3B.

The best case selection unit 105 performs the information retrieving process on predetermined information database (not shown in FIG. 1), etc. using each generated candidate for a retrieval key (step S105). Furthermore, for the document ID (x) of the document selected from the retrieval result, the candidate for a retrieval key when the order in the retrieval result of the selected document x is the best is defined as a "best retrieval key", and the order is defined as a "best order" (step S106).

Then, the best case selection unit 105 sets the keyword 33 obtained before retrieval extracted from the voice data 32 corresponding to the retrieval history data 30 as a keyword, generates the best case data 34 constituted by "a keyword, the best retrieval key designated in step S106, a selected document ID (x), the best order of the selected document x" etc., and registers the data in the best case data storage unit 28 (step S107). For example, assume that the generated best case data 34 indicates the selected document ID=x, the best order=2, and the best retrieval key="different tone, black, left". When the best case data storage unit 28 does not accumulate the best case data 34 having the selected document as the document x and the best order higher than 2, the case ID=0903 is added to the "keyword="different tone, black, left, faint", the best retrieval key="different tone, black, left", the best case data 34 of the selected document ID=x, and the best order=2" as shown in FIG. 3C, and the result is registered in the best case data storage unit 28.

[Retrieval Applicability Determining Process]

Relating to an information retrieving process, the information retrieval applicability determining process (retrieval applicability determining process) is a process of comparing the information about the keyword 33 obtained before retrieval extracted from the retrieval history data 30 and the voice data 32 with the best case data 34 accumulated in the best case data storage unit 28, and determining the applicability of the retrieval process.

Figure 4:
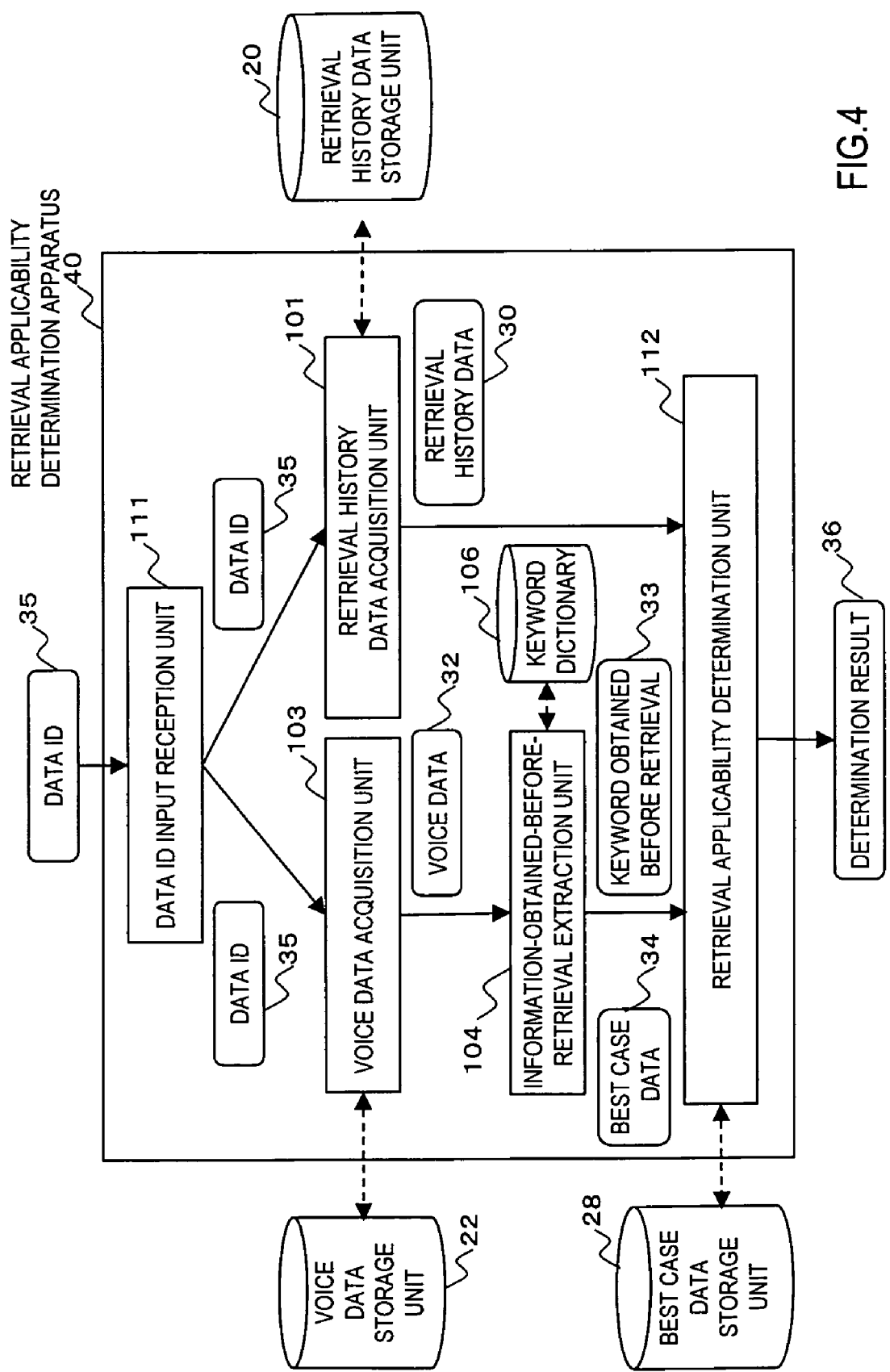
FIG. 4 shows an example of the configuration of the retrieval applicability determination device.

FIG. 4 shows an example of the configuration of a retrieval applicability determination apparatus 40. The retrieval applicability determination apparatus 40 includes the retrieval history data storage unit 20, the voice data storage unit 22, the best case data storage unit 28, the retrieval history data acquisition unit 101, the voice data acquisition unit 103, the information-obtained-before-retrieval extraction unit 104, the keyword dictionary 106, a data ID input reception unit 111, and a retrieval applicability determination unit 112.

The data ID input reception unit 111 is processing means for acquiring the data ID of the data relating to the information retrieving process to be determined.

The retrieval applicability determination unit 112 is processing means for extracting the best case data 34 having a keyword matching the keyword 33 obtained before retrieval from the best case data storage unit 28, and determining based on the best case data 34 the applicability of the information retrieving process to be determined. The process result of the retrieval applicability determination unit 112 is output as the determination result 36.

The retrieval history data storage unit 20, the voice data storage unit 22, the best case data storage unit 28, the retrieval history data acquisition unit 101, the voice data acquisition unit 103, the information-obtained-before-retrieval extraction unit 104, and the keyword dictionary 106 are processing means similar to the processing means assigned the same number that constitute the best case generation apparatus 10.

Figure 5:
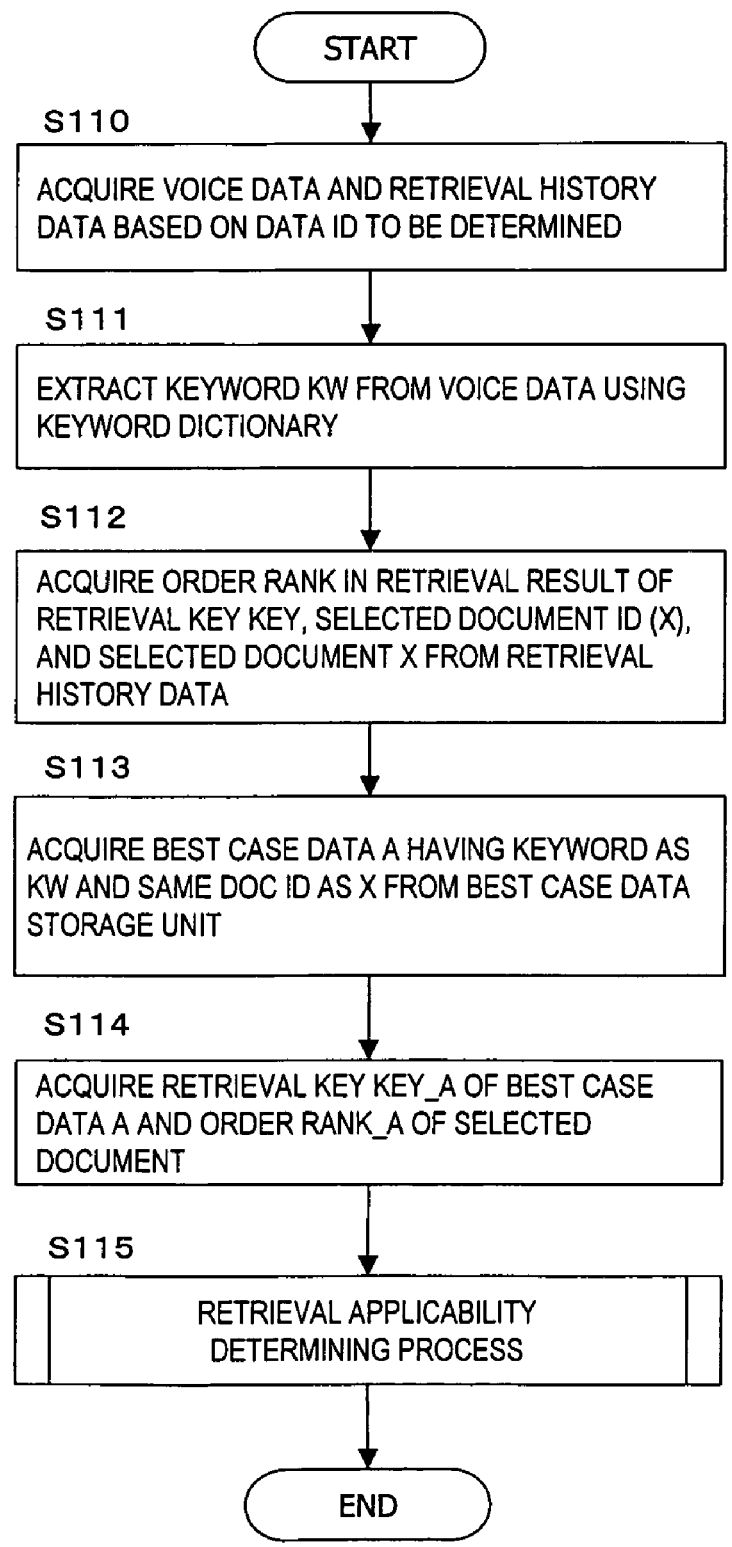
FIG. 5 shows a process flow of the retrieval applicability determining process.

FIG. 5 shows the process flow of the retrieval applicability determining process. The data ID input reception unit 111 inputs data ID 35 of the data relating to the information retrieving process to be determined. The retrieval history data acquisition unit 101 acquires the retrieval history data 30 corresponding to the data ID 35 from the retrieval history data storage unit 20. The voice data acquisition unit 103 acquires the voice data 32 corresponding to the data ID 35 from the voice data storage unit 22 (step silo).

Figure 6A:
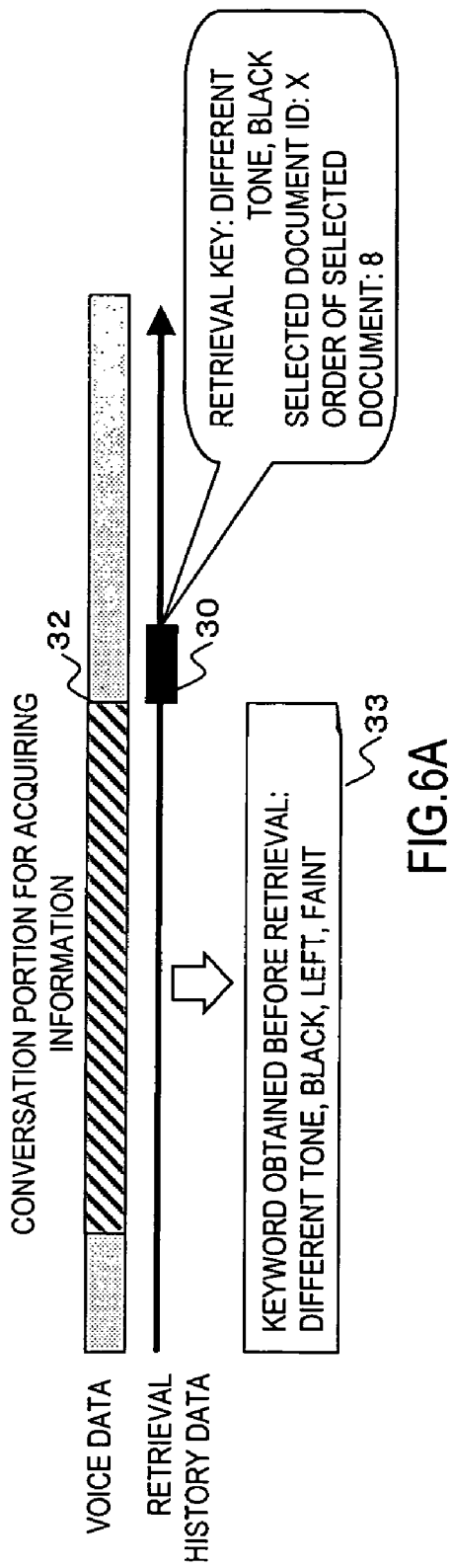
FIG. 6A and 6B show an explanatory view of the retrieval applicability determining process.

The information-obtained-before-retrieval extraction unit 104 extracts the expression (keyword KW) matching the keyword contained in the keyword dictionary 106 from the voice data 32 using the keyword dictionary 106, and defines the extracted expression as the keyword 33 obtained before retrieval (step S111). For example, as shown in FIG. 6(A), assume that the retrieval history data 30 acquired in step S110 is "retrieval key=different tone, black, the selected document ID=x, the order of the selected document x=8", and the keyword KW extracted as the keyword 33 obtained before retrieval in step S111 is "different tone, black, left, faint".

The retrieval applicability determination unit 112 acquires the best retrieval key (retrieval key Key), the selected document ID (document x), and the order (order Rank) in the retrieval result of the selected document x from the retrieval history data 30 (step S112).

Figure 6B:
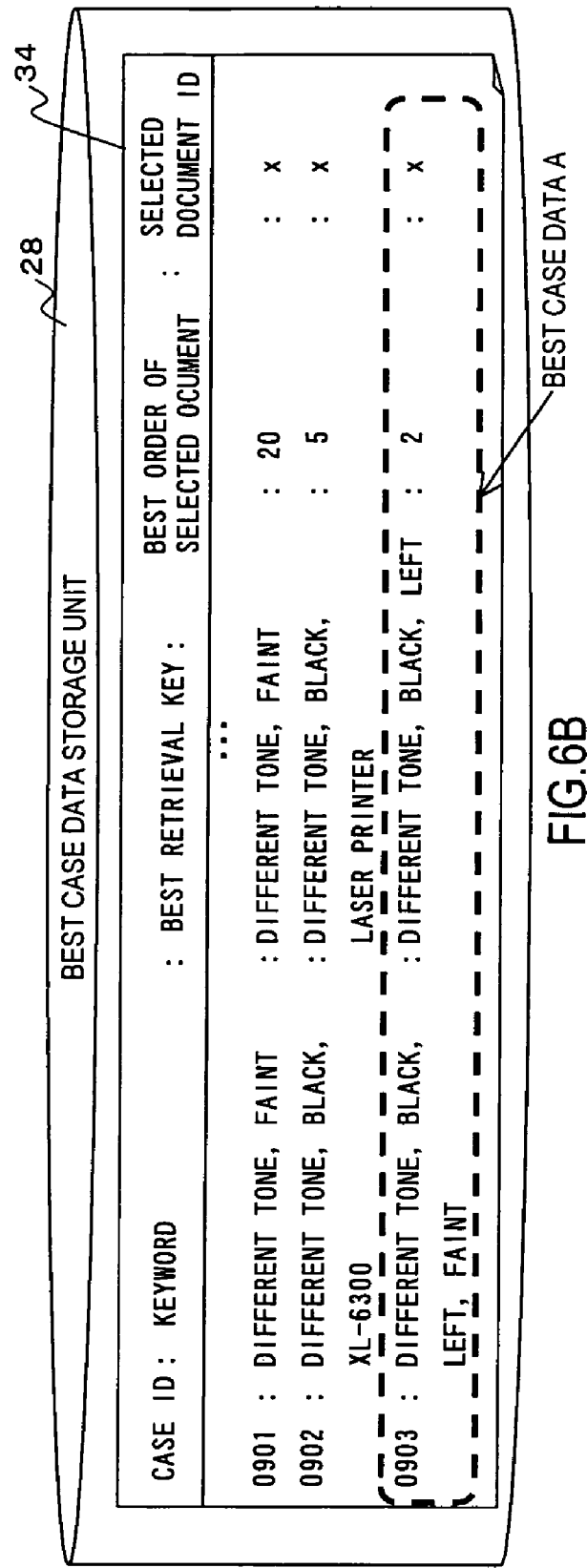

The retrieval applicability determination unit 112 acquires the best case data A having the same keyword as the keyword KW and the same document ID as x from the best case data storage unit 28 (step S113). Assuming that the best case data storage unit 28 accumulates the best case data 34 as shown in FIG. 6(B), the retrieval applicability determination unit 112 extracts the best case data A of the case ID=0903 enclosed by the rectangle of dotted lines.

Furthermore, the retrieval applicability determination unit 112 acquires the retrieval key (retrieval key Key_A) of the best case data A and the order (order Rank_A) (step S114). The retrieval applicability determination unit 112 performs the retrieval applicability determining process (step S115).

Figure 7:
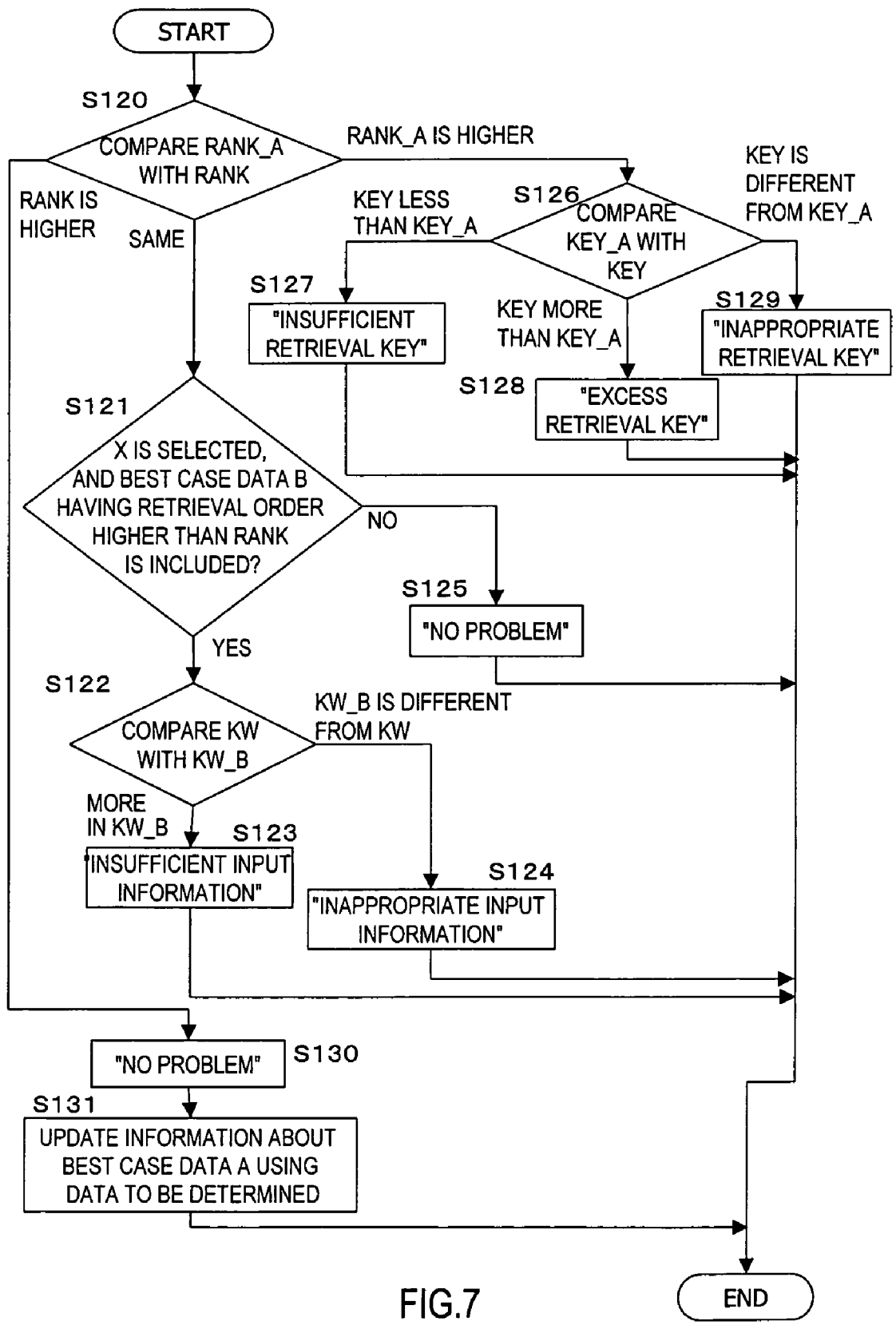
FIG. 7 shows a process flow of the retrieval applicability determining process in step S115.

FIG. 7 shows the process flow of the retrieval applicability determining process in step S115. The retrieval applicability determination unit 112 compares the order Rank of the retrieval history data 30 with the order Rank_A of the best case data 34 (step S120). When the order Rank_A is the same as the order Rank, the best case data storage unit 28 selects x as the document ID, and retrieves another best case data B having the retrieval order of the document x higher than the order Rank (step S121). When there is the best case data B (YES in step S121), the number of the keyword KW is compared with the number of the keywords (keyword KW_B) of the best case data B (step S122).

When number of the keyword KW_B is larger than the number of the keyword KW, and the keyword KW_B includes all expressions of the keyword KW (KW_B ⊃ KW), it is determined that the keyword 33 obtained before retrieval is insufficiently acquired ("insufficient input information") (step S123). When the contents are different between the keyword KW_B and the keyword KW, and the keyword KW_B and the keyword KW do not share a common expression (KW_B≠KW), it is determined that the keyword 33 obtained before retrieval has been inappropriately acquired ("inappropriate input information") (step S124).

When the best case data B satisfying the condition in the process in step S121 is not extracted (NO in step S121), the keyword 33 obtained before retrieval is determined to be appropriate ("no problem") (step S125).

In the process in step S120, when the order Rank_A is higher than the order Rank, the retrieval key Key_A of the best case data A is compared with the retrieval key Key of the retrieval history data 30 (step S126).

When the number of the retrieval key Key is smaller than the retrieval key Key_A, and the expression of the retrieval key Key is completely included in the retrieval key Key_A (Key_A ⊃ Key), it is determined that the input retrieval key is insufficient ("insufficient retrieval key") (step S127). When the number of retrieval key Key is larger than the retrieval key Key_A, and the retrieval key Key completely includes the expression of the retrieval key Key_A (key ⊃ key_A), it is determined that there are too many input retrieval keys ("excess retrieval key") (step S128).

Furthermore, in the retrieval applicability determination unit 112, when the contents of the retrieval key Key are different from the contents of the retrieval key Key_A, and the retrieval key Key and the retrieval key Key_A do not share the same expression (Key≠Key_A), it is determined that the input retrieval key is inappropriate ("inappropriate retrieval key") (step S129). When the order Rank is better than the order Rank_A in the process in step S120, the keyword 33 obtained before retrieval and the input retrieval key is appropriate ("no problem") (step S130).

Since the information about the information retrieving process to be determined indicates a better result than the best case data A, the retrieval applicability determination unit 112 updates the best case data storage unit 28 using the new best case data 34 generated based on the contents of the retrieval history data 30 to be determined and the keyword 33 obtained before retrieval (keyword KW). Furthermore, when the expression not contained in the keyword dictionary 106 is a keyword KW or included in the retrieval key Key, the expression is added to the keyword dictionary 106 (step S131).

[Operator Skill Determining Process]

The operator skill determining process is a process of determining the information retrieval skill of each operator using the retrieval key of the retrieval history data 30 and the keyword 33 obtained before retrieval extracted from the voice data 32 as in the above-mentioned retrieval applicability determining process.

Figure 8:
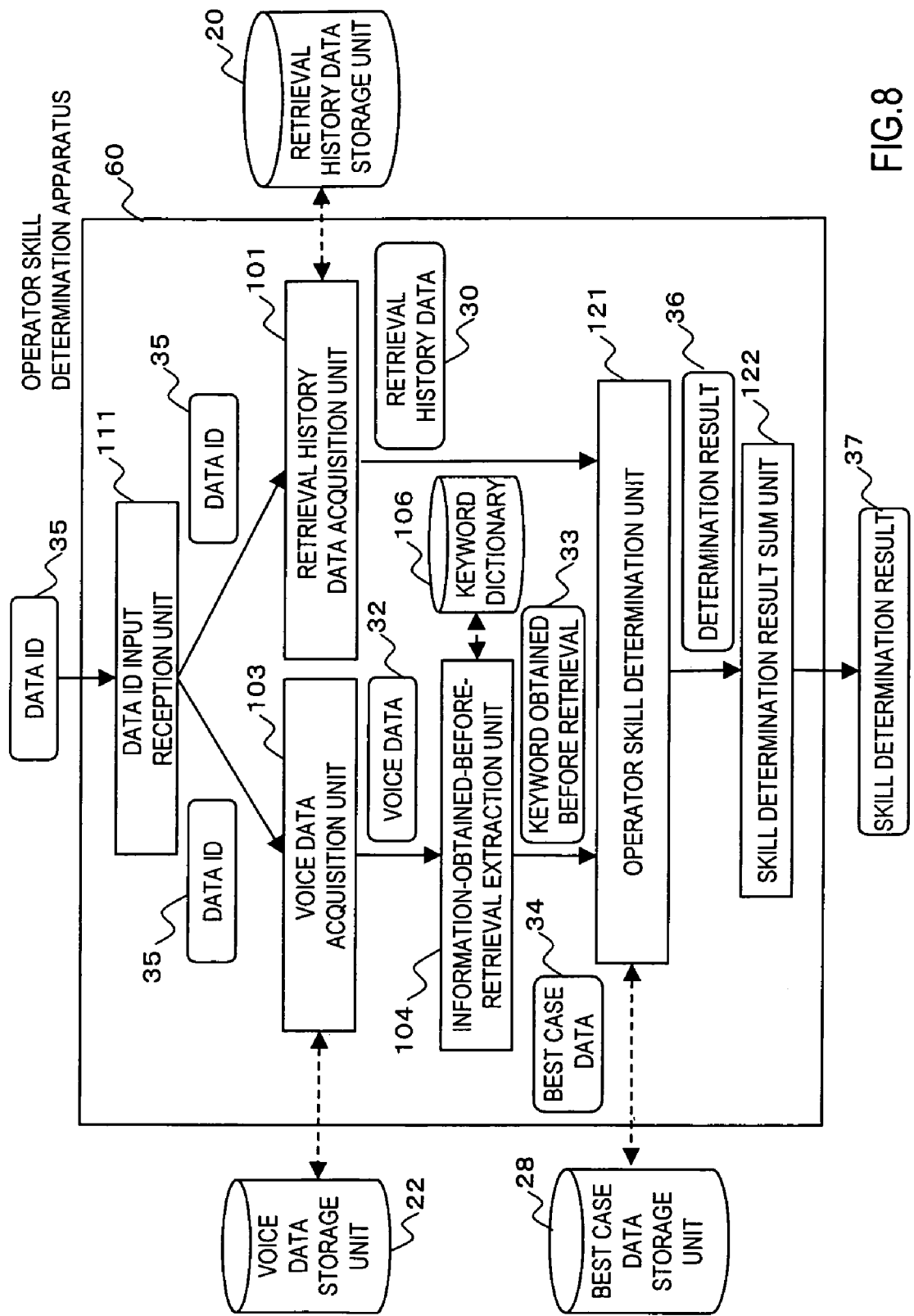
FIG. 8 shows an example of the configuration of an operator skill determination apparatus 60.

FIG. 8 shows an example of the configuration of the operator skill determination apparatus 60. The operator skill determination apparatus 60 includes the retrieval history data storage unit 20, the voice data storage unit 22, the best case data storage unit 28, the retrieval history data acquisition unit 101, the voice data acquisition unit 103, the keyword dictionary 106, the data ID input reception unit 111, an operator skill determination unit 121, and a skill determination result sum unit 122.

The operator skill determination unit 121 is processing means for determining the applicability of the information retrieval skill of an operator based on the retrieval history data 30 of the information retrieving process performed by each operator and the voice data 32.

The operator skill determining process is determined by two items of "information acquisition skill" and "retrieval key selection skill". The information acquisition skill is a skill to acquire necessary information for information retrieval by performing a conversation before the information retrieval, and evaluate the information based on the applicability of the keyword 33 obtained before retrieval extracted from the voice data 32. The retrieval key selection skill is a skill to select a retrieval key used in information retrieval from the necessary information for the information retrieval obtained from a conversation, etc., and evaluate the key based on the applicability of the retrieval key of the retrieval history data 30.

The skill determination results sum unit 122 add up for each operator the two determination results of the information acquisition skill and the retrieval key selection skill calculated by the operator skill determination unit 121. The process result of the skill determination result sum unit 122 is output as a skill determination result 37.

The retrieval history data storage unit 20, the voice data storage unit 22, the best case data storage unit 28, the retrieval history data acquisition unit 101, the voice data acquisition unit 103, the information-obtained-before-retrieval extraction unit 104, and the keyword dictionary 106 are the processing means similar to the processing means assigned the same reference numerals of the components constituting the best case generation apparatus 10. The data ID input reception unit 111 is the processing means as the processing means assigned the same reference numerals of the components constituting the retrieval applicability determination apparatus 40.

Figure 9:
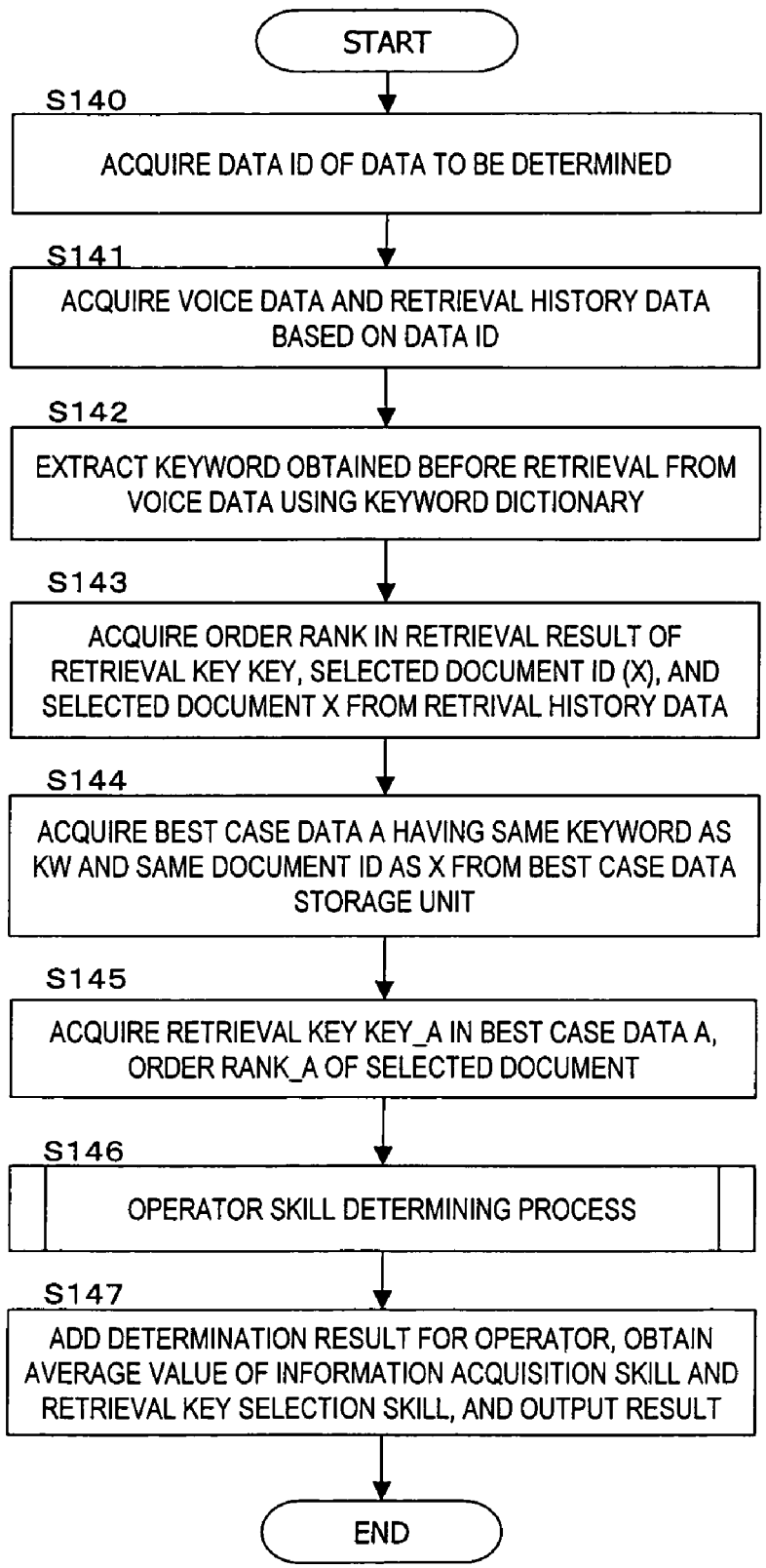
FIG. 9 shows a process flow of the operator skill determining process.

FIG. 9 shows the process flow of the operator skill determining process. The data ID input reception unit 111 sequentially acquires the data ID 35 from the list of the data ID of the data relating to the information retrieving process to be determined and performed by the operator (step S140). The processes in and after step S141 are performed for each data ID 35.

The retrieval history data acquisition unit 101 acquires the retrieval history data 30 corresponding to the data ID 35 from the retrieval history data storage unit 20. The voice data acquisition unit 103 acquires the voice data 32 corresponding to the data ID 35 from the voice data storage unit 22 (step S141).

The information-obtained-before-retrieval extraction unit 104 extracts from the voice data 32 using the keyword dictionary 106 an expression (keyword KW) matching the keyword registered in the keyword dictionary 106 as the keyword 33 obtained before retrieval (step S142). The operator skill determination unit 121 acquires from the retrieval history data 30 a retrieval key (retrieval key Key), a selected document ID (document x), an order (order Rank) in the retrieval result of the selected document x (step S143).

The operator skill determination unit 121 acquires from the best case data storage unit 28 the best case data A having the same keyword as the keyword KW and the same document ID as x (step S144). Furthermore, it acquires the retrieval key (retrieval key Key_A) of the best case data A and the order (order Rank_A) (step S145). Then, the operator skill determining process is performed (step S146).

Next, the skill determination result sum unit 122 adds up for each operator the determination result in step S146, calculates the average value of the information acquisition skill and the points of the retrieval key selection skill, and outputs the value as the skill determination result 37 of the operator (step S147).

Figure 10:
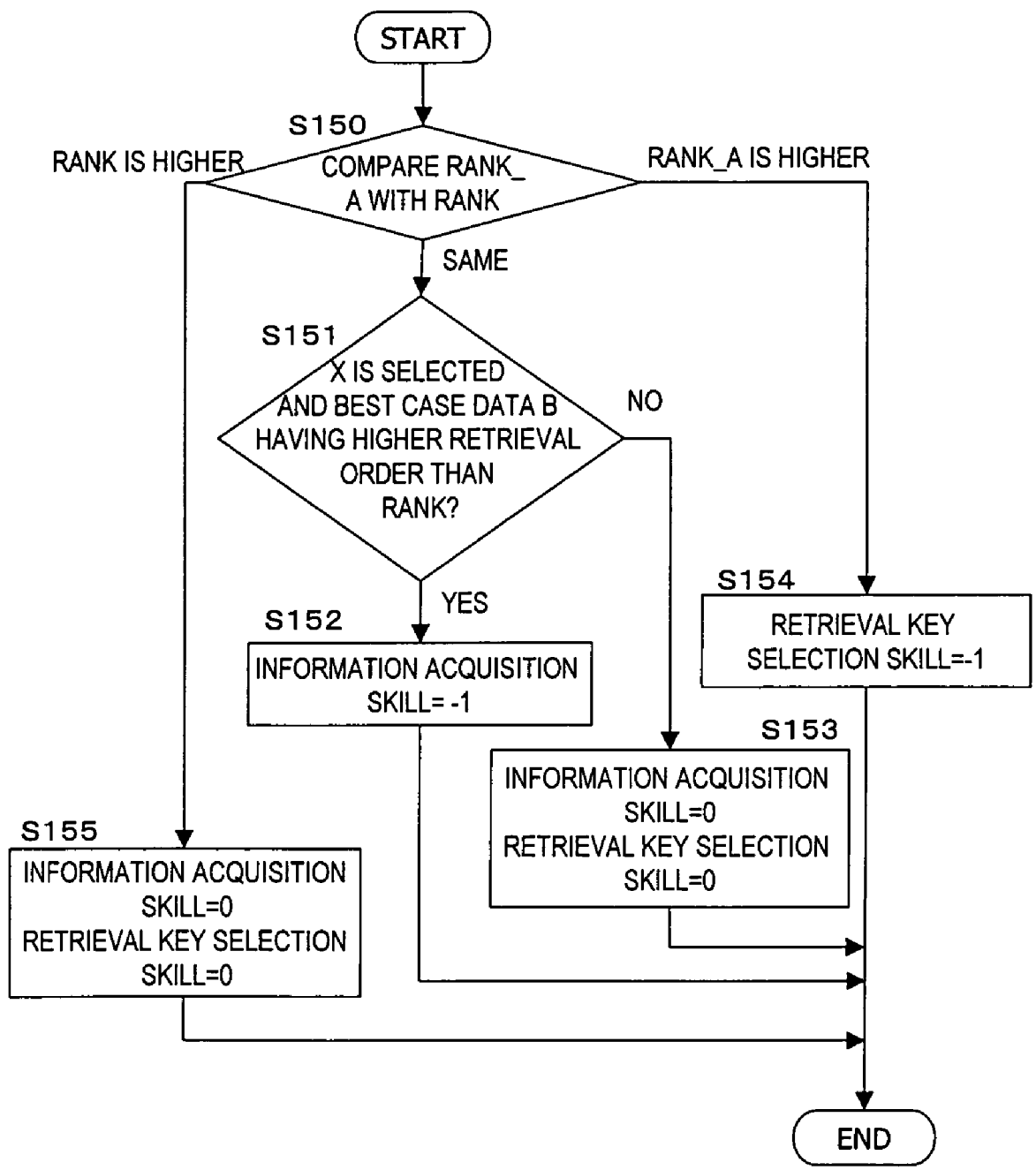
FIG. 10 shows a process flow of an operator determining process in step S146.

FIG. 10 shows the process flow of the operator determining process in step S146. The operator skill determination unit 121 compares the order Rank of the retrieval history data 30 with the order Rank_A of the best case data A (step S150). When the order Rank is the same as order Rank_A, in the best case data storage unit 28, another best case data B in which x is selected as a document ID, and the retrieval order of the document x is higher than the order Rank is retrieved (step S151). When there is the best case data B (YES in step 151), the information acquisition skill is decreased (−1) (step S152). When there is no best case data B (NO in step S151), the information acquisition skill=0, the retrieval key selection skill=0, and there is no decrease (step S153).

When the order Rank_A is higher than the order Rank in the process in step S150, the operator skill determination unit 121 decreases the retrieval key selection skill (−1) (step S154). When the order Rank is higher than the order Rank_A in the process in step S150, the information acquisition skill=0, the retrieval key selection skill=0, and there is no decrease (step S155).

The operator skill determination unit 121 compares the keyword 33 obtained before retrieval (keyword KW) and the retrieval key of the retrieval history data 30 (retrieval key Key), and when the information acquisition skill and the retrieval key selection skill are evaluated, the number of keywords KW and the expressions constituting the retrieval key Key and the difference in contents are represented by values to obtain each skill, and more detailed points can be output as the skill determination result 37.

[Best Retrieval Key Candidate Presenting Process]

The best retrieval key candidate presenting process is a process of extracting a candidate for a retrieval key considered to be the best using the best case data to support the information retrieval of an operator when a client is talk with the operator, and presenting the operator with the candidate.

In the retrieval applicability determining process and the operator skill determining process, the voice data 32 recorded when the operator talks with a client is temporarily accumulated in the voice data storage unit 22. In the best retrieval key candidate presenting process, the data used as the voice data 32 is voice data acquired in real time when the operator talks with a client. The keyword of the keyword 33 obtained before retrieval is extracted at any time from the voice data 32 acquired in real time, and when the operator retrieves information, the retrieval key considered to be the best is extracted from the best case data 34, and the extracted key is presented to the operator as the candidate for the best retrieval key. Then, the information retrieval support for the operator is performed when the operator talks with a client by the operator referring to a candidate for the best retrieval key.

Figure 11:
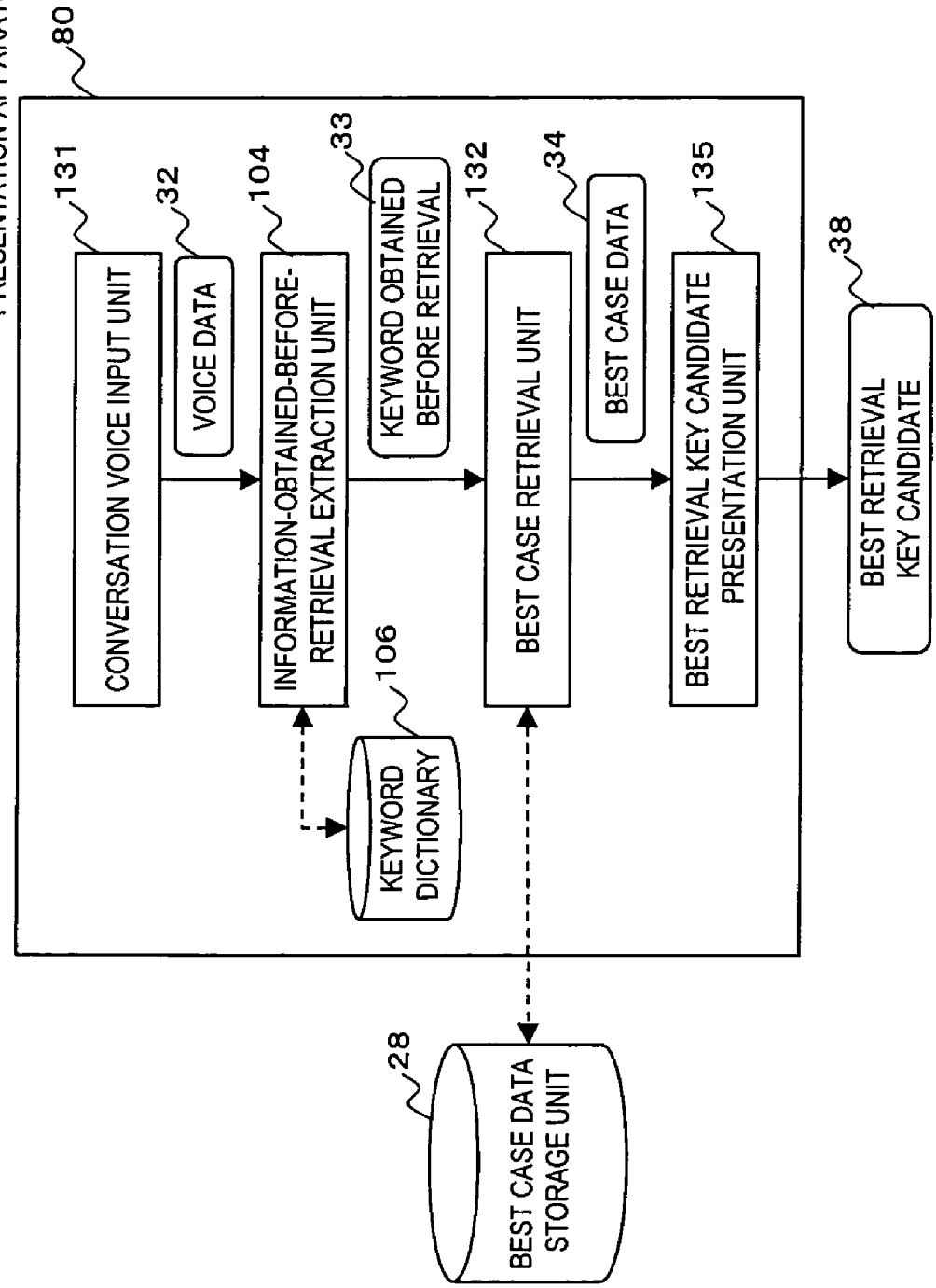
FIG. 11 shows an example of the configuration of a best retrieval key candidate presentation apparatus 80.

FIG. 11 shows an example of the configuration of the best retrieval key candidate presentation apparatus 80. The best retrieval key candidate presentation apparatus 80 includes the best case data storage unit 28, the information-obtained-before-retrieval extraction unit 104, the keyword dictionary 106, a conversation voice input unit 131, a best case retrieval unit 132, and a best retrieval key candidate presentation unit 133.

The conversation voice input unit 131 is processing means for acquiring at any time the voice data 32 which is conversation voice between the operator and a client.

The best case retrieval unit 132 is processing means for searching the best case data storage unit 28 using the keyword 33 obtained before retrieval extracted from the voice data 32 before the information retrieving process.

The best retrieval key candidate presentation unit 135 selects the retrieval key in the best order in the document to be selected from the extracted best case data 34, and presents it as the best retrieval key candidate 38.

The best case data storage unit 28, the information-obtained-before-retrieval extraction unit 104, and the keyword dictionary 106 is processing means almost the same as the processing means assigned the same reference numeral of the component of the best case generation apparatus 10.

Figure 12:
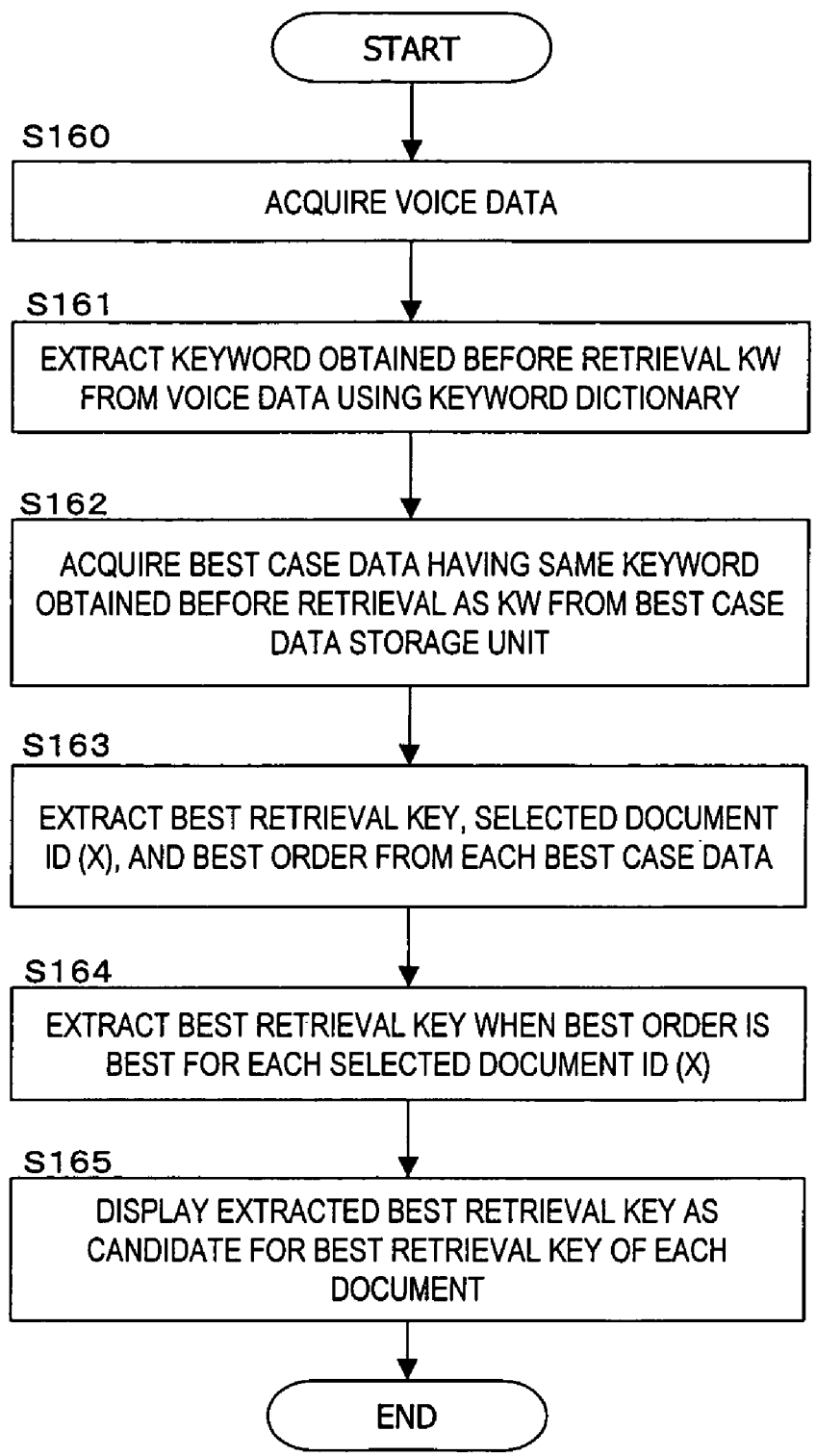
FIG. 12 shows a process flow of the best retrieval key candidate presenting process.

FIG. 12 shows the process flow of the best retrieval key candidate presenting process. The conversation voice input unit 131 acquires the voice data 32 obtained by recording the conversation voice between the operator and a client in real time (step S160). The voice data 32 is acquired at a predetermined time period. The information-obtained-before-retrieval extraction unit 104 extracts at any time the expression (keyword KW) matching the keyword contained in the keyword dictionary 106 from the voice data 32 as the keyword 33 obtained before retrieval using the keyword dictionary 106 (step S161).

The best case retrieval unit 132 acquires the best case data 34 having the same keyword as the keyword KW from the best case data storage unit 28 (step S162). Then, it extracts the best retrieval key of the best case data 34, the selected document ID, and the best order (step S163). For each of the extracted document ID (x), the best retrieval key having the best order of the document x is extracted (step S164). The best retrieval key extracted for each document x is displayed as the best retrieval key candidate 38 (step S165). When there are plural best retrieval key candidates 38 for each document, they are displayed as a list.

Next, as a practical embodiment of the present invention, the process performed when the present invention is embodied as an operator skill determination system 100 provided in the call center is explained below.

In the call center, a repair of a product is accepted from a client, an operator hears the contents of the fault from a client, searches a predetermined case database, refers to the retrieval result, and returns the solving method of the fault to the client, and so on.

Figure 13:
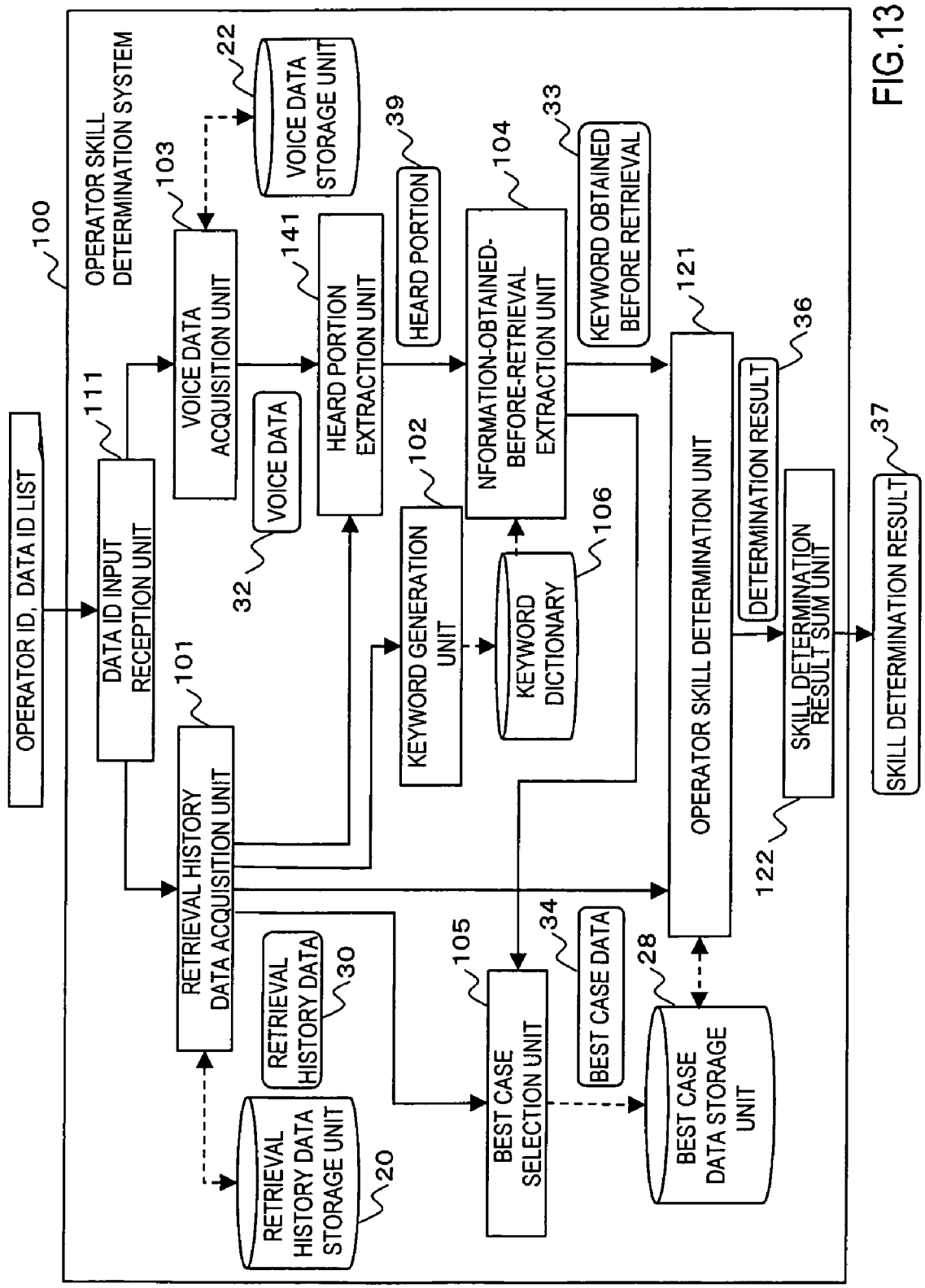
FIG. 13 shows an example of the configuration of an operator skill determination system.

FIG. 13 shows an example of the configuration of the operator skill determination system 100. The operator skill determination system 100 includes the retrieval history data storage unit 20, the voice data storage unit 22, the best case data storage unit 28, the retrieval history data acquisition unit 101, the keyword generation unit 102, the voice data acquisition unit 103, the information-obtained-before-retrieval extraction unit 104, the best case selection unit 105, the keyword dictionary 106, the data ID input reception unit 111, the operator skill determination unit 121, the skill determination result sum unit 122, and a heard portion extraction unit 141.

The heard portion extraction unit 141 is processing means for extracting a conversation portion (heard portion) 39 as the necessary information for case retrieval from the voice data 32 acquired by the voice data acquisition unit 103.

The retrieval history data storage unit 20, the voice data storage unit 22, the best case data storage unit 28, the retrieval history data acquisition unit 101, the keyword generation unit 102, the voice data acquisition unit 103, the information-obtained-before-retrieval extraction unit 104, the best case selection unit 105, the keyword dictionary 106, the data ID input reception unit 111, the operator skill determination unit 121, and the skill determination result sum unit 122 perform the same processes as the processing means having the same reference numerals shown in FIGS. 1, 4, 8, and 11.

In the skill determining process of the operator skill determination system 100, as an operator skill determination, the skill acquired from a client for necessary information before retrieval of a case (keyword obtained before retrieval) is calculated as a "information acquisition skill point I", and the skill of selecting a selection key for use in information retrieval based on a keyword obtained before retrieval is calculated as a "retrieval key selection skill point S". Each skill point ranges from 0 to 1.

Relating to the information acquisition skill point I, the keyword 33 obtained before retrieval in the case retrieval to be determined is compared with the keyword of the best case data 34, and the maximum value of 1 is assigned when there is no problem. When there is a difference between the keyword of the best case data 34 and the keyword 33 obtained before retrieval, the rate of the number of common keywords in the number of keywords of the best case data 34 is assigned as a point. Therefore, the larger the number of expressions common between the keyword 33 obtained before retrieval and the keywords of the best case data 34, the closer to the maximum value of 1 as the value of the information acquisition skill point I.

Furthermore, relating to the retrieval key selection skill point S, the retrieval key of the retrieval history data 30 in the case retrieval to be determined is compared with the retrieval key of the best case data 34, and the maximum value of 1 is assigned when there is no problem. When there is a difference between the retrieval key of the best case data 34 and the retrieval key of the retrieval history data the rate of the number of the common retrieval keys in the retrieval keys of the best case data 34 is assigned as a point. Therefore, the larger the number of common expressions between the retrieval keys of the retrieval history data 30 and the retrieval keys of the best case data 34, the closer to the maximum value of 1 of the retrieval key selection skill point S.

Next, the process of the operator skill determination system 100 is explained in more detail.

The best case data generating and accumulating process of the operator skill determination system 100 generates the best case database by accumulating the past retrieval case data in the best case data storage unit 28. The data ID list of the data relating to the past retrieval case of concern is prepared.

First, keywords are accumulated in the keyword dictionary 106.

Figure 14:
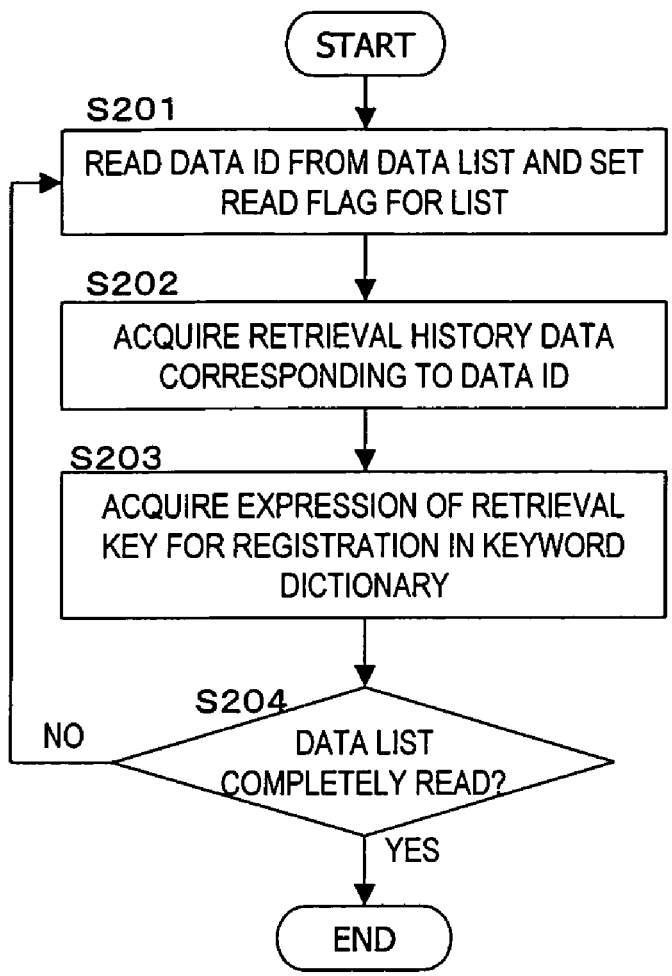
FIG. 14 shows a process flow of the keyword dictionary generating process.

FIG. 14 shows the process flow of the keyword dictionary generating process. The data ID input reception unit 111 reads an operator ID and the data ID 35 from the data ID list, and sets a read flag for the corresponding data ID of the data ID list (step S201). The retrieval history data acquisition unit 101 acquires the retrieval history data 30 corresponding to the data ID 35 from the retrieval history data storage unit 20 (step S202).

Figure 15:
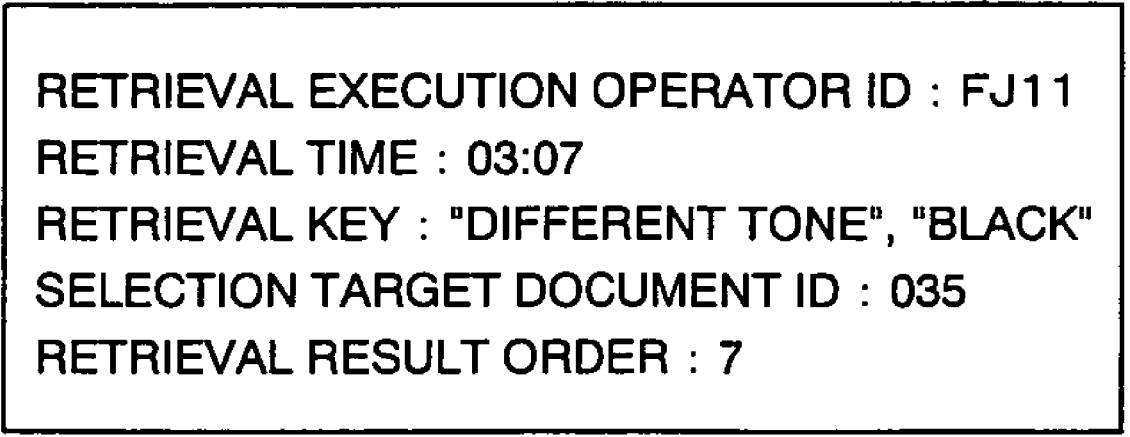
FIG. 15 shows an example of retrieval history data.

FIG. 15 shows an example of the retrieval history data 30. The retrieval history data 30 stores the information such as a retrieval execution operator ID for designation of an operator who performs information retrieval, retrieval time indicating the time in which the information retrieving process is performed, a retrieval key used in information retrieval, a selection target document ID for designation of a document selected from a retrieval result, a retrieval result order indicating the order in the selection result of the document to be selected, etc.

The keyword generation unit 102 acquires the expression of the retrieval key of the retrieval history data 30, and registers the expression in the keyword dictionary 106 (step S203). For example, when the information "black" is to be heard required when the retrieval key "black" is selected, various expressions such as "black, blackish, somewhat black, deep black", etc. are expected to be used in an actual conversation. Therefore, the expression rules as shown in FIG. 16A is prepared. By applying the expression rule, the expressions of the variations of the expression (A012, black) of the retrieval key of the acquired retrieval history data 30 shown in FIG. 16B are generated. The keyword dictionary 106 stores the data constituted by a combination of an expression of a generated variation as a read candidate and an expression output as a keyword.

The keyword generation unit 102 checks whether or not all data ID 35 of the data ID list have completely read (step S204). If all data ID 35 have not been read (NO in step S204), the processes in steps S201 to S203 are repeated. If all data ID 35 have been read (YES in step S204), the process terminates.

The operator skill determination system 100 performs the best case data generating and accumulating process when a keyword is registered in the keyword dictionary 106.

Figure 17:
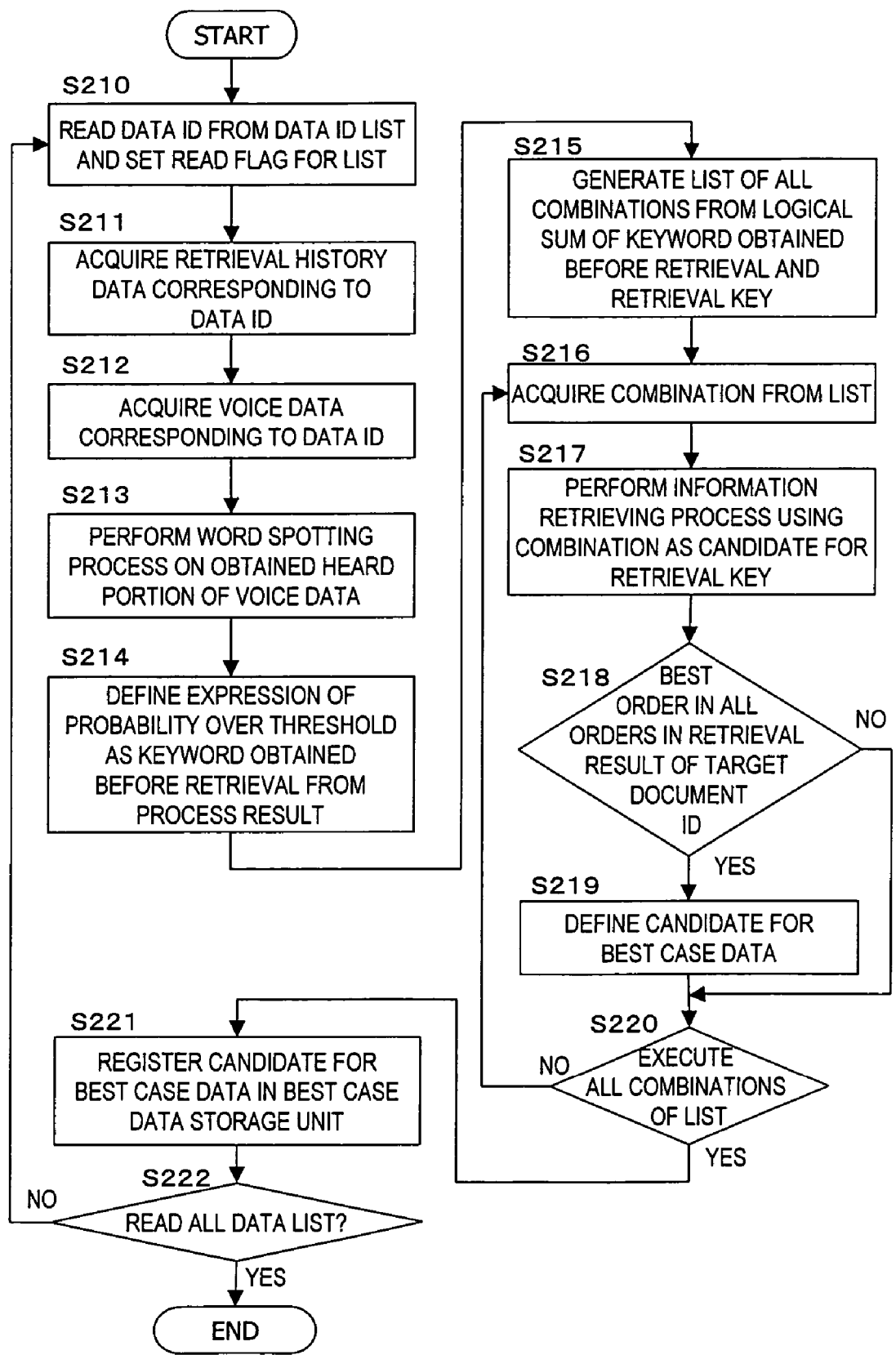
FIG. 17 shows a process flow of the best case data generating and accumulating process.

FIG. 17 shows the process flow of the best case data generating and accumulating process. The data ID input reception unit 111 reads the data ID 35 from the data ID list, and sets a read flag (step S210). The retrieval history data acquisition unit 101 acquires the retrieval history data 30 corresponding to the data ID 35 from the retrieval history data storage unit 20 (step S211). For example, the retrieval history data 30 shown in FIG. 15 is acquired. The voice data acquisition unit 103 acquires the voice data 32 corresponding to the data ID 35 from the voice data storage unit 22 (step S212). The heard portion extraction unit 141 acquires the heard portion 39 from the voice data 32. The word spotting process of the expression of the keyword registered in the keyword dictionary 106 is performed on the heard portion 39 (step S213).

The extracting method of the heard portion 39 can be a method of assigning an index to a portion from which information is to be heard, and extracting the heard portion based on the index, or a method of detecting a non-sound portion as a delimiter, determining the range of the heard portion 39 based on the delimiter, and extracting the heard portion. For example, the heard portion 39 can be the voice data recorded for five minutes before the retrieval history data 30 is retrieved.

The information-obtained-before-retrieval extraction unit 104 assumes the expression whose probability is higher than a predetermined threshold as the keyword 33 obtained before retrieval from the result of the word spotting process (step S214). For example, if the threshold is 0.7 when the result of the word spotting process as shown in FIG. 18 is obtained, then "different tone", "black", "faint", and "left" are selected as the keyword 33 obtained before retrieval.

The best case selection unit 105 generates a list of all combinations from the expressions of a logical sum of the keyword 33 obtained before retrieval extracted in step 214 and the retrieval key of the retrieval history data 30 in step 211 (step S215). As shown in FIG. 19(A), from a logical sum of the expressions of "different tone", "black", "faint", and "left", the list of the combinations as shown information 19(B) is generated.

Then, the best case selection unit 105 sequentially acquires a combination from the combination list (step S216), and the information retrieving process (case retrieving process) is performed using the acquired combination as a candidate for a retrieval key (step S217). It is determined whether or not, as a result of the information retrieving process, the order in the retrieval result about the same document x as the selection target document ID of the retrieval history data 30 is higher than the best order of the best case data 34 accumulated in the best case data storage unit 28 (step S218). If the retrieval result by a candidate for a retrieval key is the best as compared with the currently accumulated best case data 34 (YES in step S218), a candidate for the best case data is generated using as keywords the retrieval key used in this information retrieving process, the selection target document ID (x), the order in the retrieval result of the selection target document x, and the corresponding keyword 33 obtained before retrieval (step S219).

Then, relating to all combinations in the combination list, it is checked whether or not the information retrieving process has been performed (step S220). Unless the information retrieving process has been performed on all combinations (NO step S220), the processes in steps S216 to S219 are repeated. On the other hand, if the information retrieving process has been performed on all combinations (YES in step S220), a candidate for the best case data is registered in the best case data storage unit 28 as the best case data 34 (step S221). For example, when the contents of the best case data storage unit 28 are as shown in FIG. 20, and when the candidate for the best case data generated in step S219 is higher in order (2) than the best order (8) of the best case data 34 having the same keyword, best retrieval key, and the selected document ID(x) registered in the best case data storage unit 28, a candidate for the best case data is registered in the best case data storage unit 28 as the best case data 34.

Furthermore, it is checked whether or not all of the data ID 35 registered in the data ID list have been read (step S222). If all of the data ID 35 have not been read (NO in step S222), the processes in steps 210 to S221 are repeated. If all data ID 35 have been read (YES in step S222), the process terminates.

Figure 21:
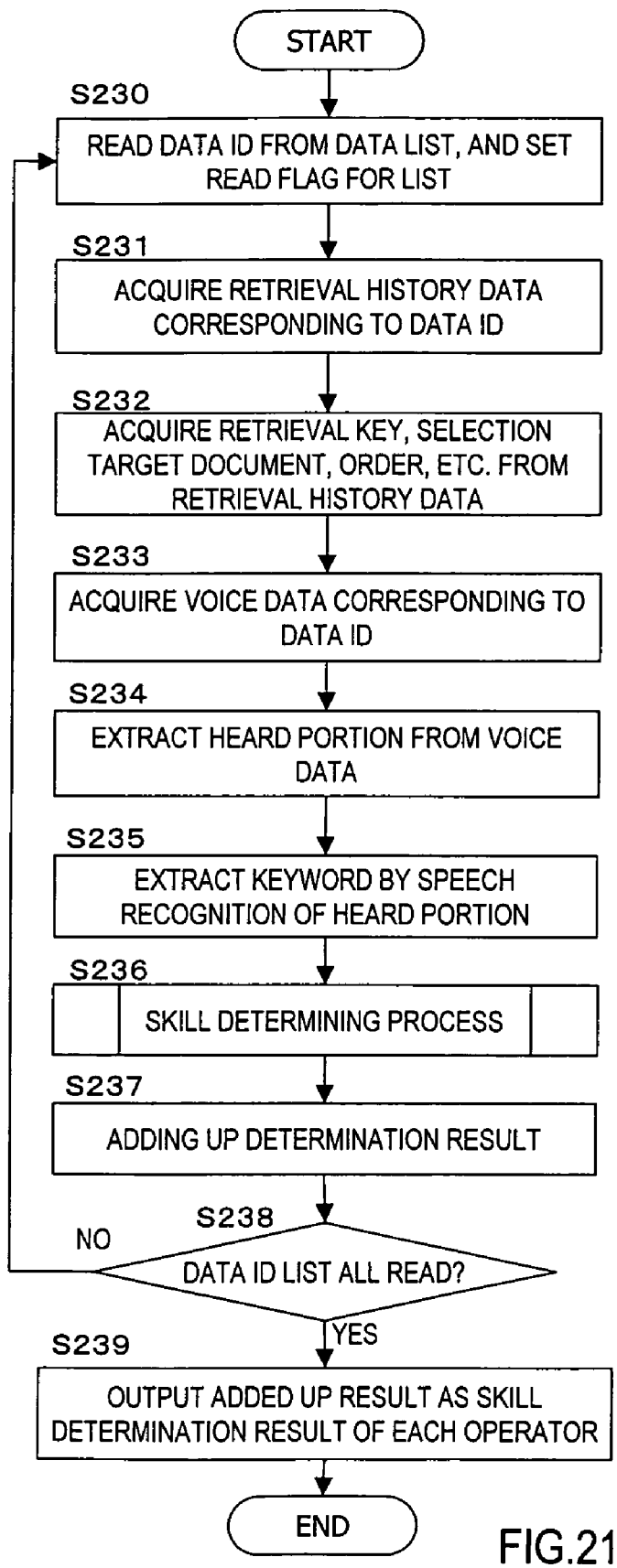
FIG. 21 shows a process flow of the operator skill determining process.

FIG. 21 shows the process flow of the skill determining process of the operator. Before the skill determining process of the operator, it is assumed that a data ID list of the data relating to the information retrieving process to be evaluated for each operator ID is generated.

The data ID input reception unit 111 reads the data ID 35 from the data list ID for each operator, and sets a read flag for the data ID list (step S230). The retrieval history data acquisition unit 101 acquires the retrieval history data 30 corresponding to the data ID 35 from the retrieval history data storage unit 20 (step S231).

Furthermore, the retrieval history data acquisition unit 101 acquires the information such as a retrieval key, a document to be selected, the order, etc. for each operator from the retrieval history data 30 (step 232).

Assume that the retrieval history data 30 shown in FIG. 22 is obtained. In the retrieval history data 30 shown in FIG. 22, the history information about two retrieving operations performed in one meeting with a client is contained as a retrieving operation of the retrieval performing operator ID=FJ11. No desired result is acquired in the first case retrieval (retrieving operation=0). In the second case retrieval (retrieving operation=1), a retrieval result is obtained. In this case, the information such as retrieval key, a selection target document ID, a retrieval result order, etc. is acquired for each retrieving operation on the two retrieving operations.

The voice data acquisition unit 103 acquires the voice data 32 corresponding to the read data ID 35 from the voice data storage unit 22 (step S233). The heard portion extraction unit 141 extracts the heard portion 39 in the voice data 32 for each retrieving operation of the retrieval history data 30 (step S234). In this example, the voice data in the period of two minutes before the retrieval execution time is extracted as the heard portion 39. For example, since the retrieval time of the first retrieval (retrieving operation=0) is 03:07 from the retrieval history data 30 shown in FIG. 22, the corresponding heard portion 39 is the voice data of the period of 01:07 to 03:07. Since the retrieval time of the second retrieval (retrieving operation=1) is 03:48, the corresponding heard portion 39 is the voice data of the period of 01:48 to 03:48.

When the retrieval key of the retrieval history data 30 is compared, the second retrieval is the narrowing retrieval of the first retrieval. Therefore, the heard portion 39 corresponding to the second retrieval can be the voice data of the period of 01:07 to 03:48 including the voice data of the heard portion 39 of the first retrieval.

The information-obtained-before-retrieval extraction unit 104 performs the voice recognizing process (word spotting process) of the heard portion 39, and extracts the keyword 33 obtained before retrieval (step S235). In this example, as a result of the process shown in FIG. 18, the expression having the probability of 0.7 or more is the keyword. From the heard portion 39 corresponding to the first retrieval, the "different tone", "black", "dirt", and "creaky" are extracted as keywords. From the heard portion 39 corresponding to the second retrieval, "different tone", "black", "dirt", "creaky", and "left" are extracted as the keyword 33 obtained before retrieval.

The operator skill determination unit 121 performs the skill determining process (step S236). The skill determination result sum unit 122 adds up the determination results 36 (the information acquisition skill point S and retrieval key selection skill point I for each data ID 35) in each information retrieving operations calculated in the skill determining process in step S236 (step S237). Then, it is checked whether or not the data IDs of the data ID list are completely read (step S238). If all data IDs in the data ID list have not been read (NO in step S238), the processes in processes in step S230 to S237 are repeated.

If all data IDs in the data ID list have been read (YES in step S238), the skill determination result sum unit 122 performs adding up the values, obtains an average value by dividing the sum by the number of pieces of data as the final skill value, and output the result as the skill determination result 37 (step S239)

Figure 23:
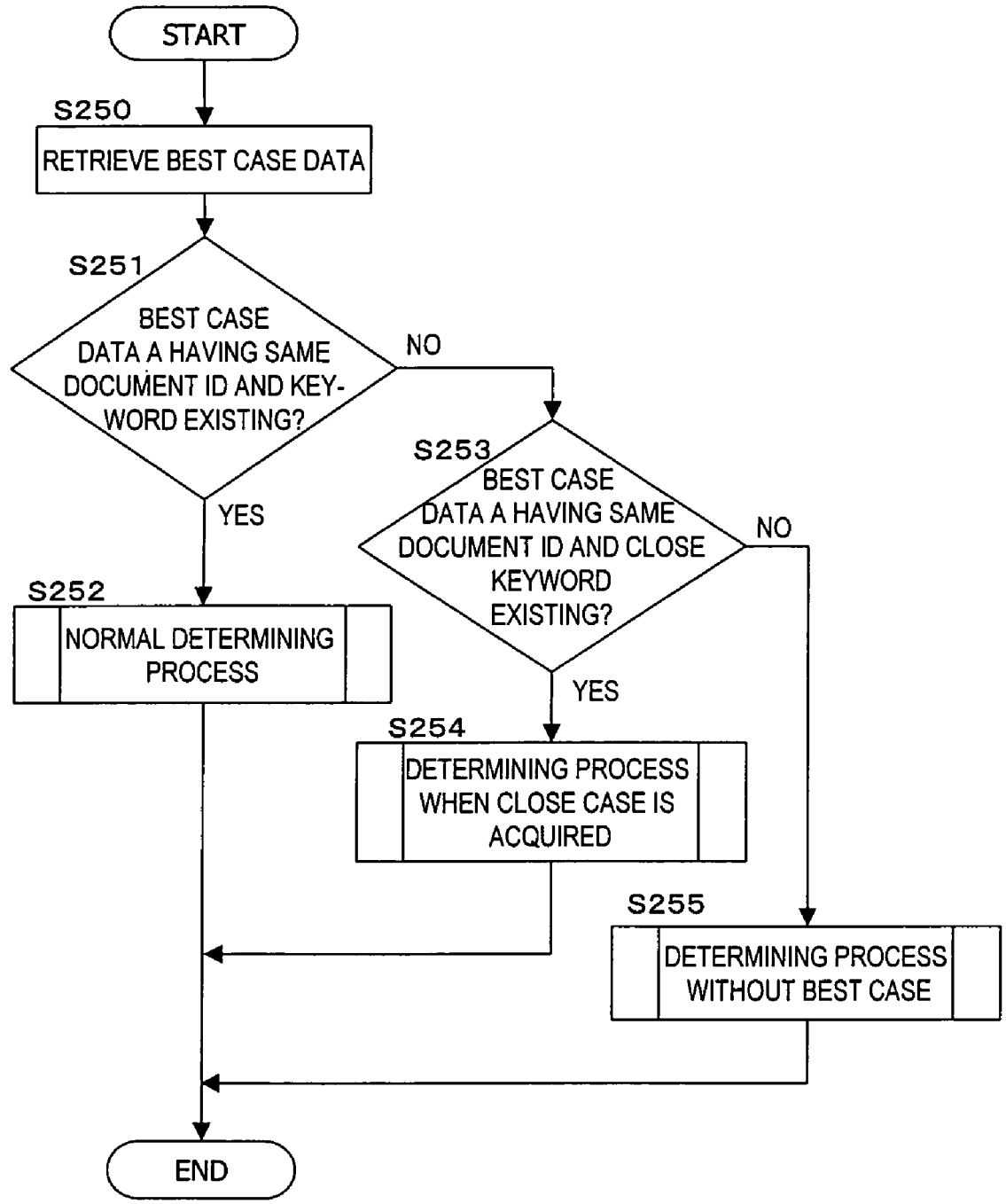
FIG. 23 shows a process flow of the skill determining process in step S236.

FIG. 23 shows the process flow of the skill determining process in step S236. The operator skill determination unit 121 retrieves the best case data 34 from the best case data storage unit 28 (step S250). The best case data 34 accumulated in the best case data storage unit 28 is generated from a past case, an enormous amount of data is expected. Therefore, the retrieval range is narrowed from the best case data storage unit 28 to retrieve the best case data 34.

The method of narrowing the retrieval range can be the following methods:

A past predetermined period is set as a retrieval range, and is defined as a retrieval target range based on the retrieval execution date and time of the best case data;

The use frequency of the best case data is counted, and determined as the target range of the best case data of a high use frequency; or When the best case data 34 is generated, the operator name of a used case and the group name (the groups are classified by the related products, services, etc.) to which the operator belongs are registered, and the best case data of the same operator group is determined as in a target range.

In this example, "the best case data of the same operator group is determined as a target area", and from the determined target area, the best case data 34 having the same selection target document ID and keyword is retrieved.

When there is the best case data A having the same selection target document ID, and the same keyword as the keyword 33 obtained before retrieval (YES in step S251), a normal determining process is performed (step S252). Or, if there is no best case data A having the same selection target document ID and keyword as the keyword 33 obtained before retrieval (NO in step S251), the best case data A having the same selection target document ID and close to the keyword 33 obtained before retrieval in keyword is retrieved (step S253). Assuming that the best case data A having the largest number of common expressions with the keyword 33 obtained before retrieval in the expressions contained in the keywords is selected as the "best case data A close to the keyword 33 obtained before retrieval in keyword".

When there is the best case data A having the same selection target document ID and close to the keyword 33 obtained before retrieval in keyword (YES in step S253), the determining process is performed when the close case is acquired (step S254). On the other hand, if there is no best case data A having the same selected document ID and close to the keyword 33 obtained before retrieval in keyword (NO in step S253), the determining process is performed without the best case (step S255).

Figure 24:
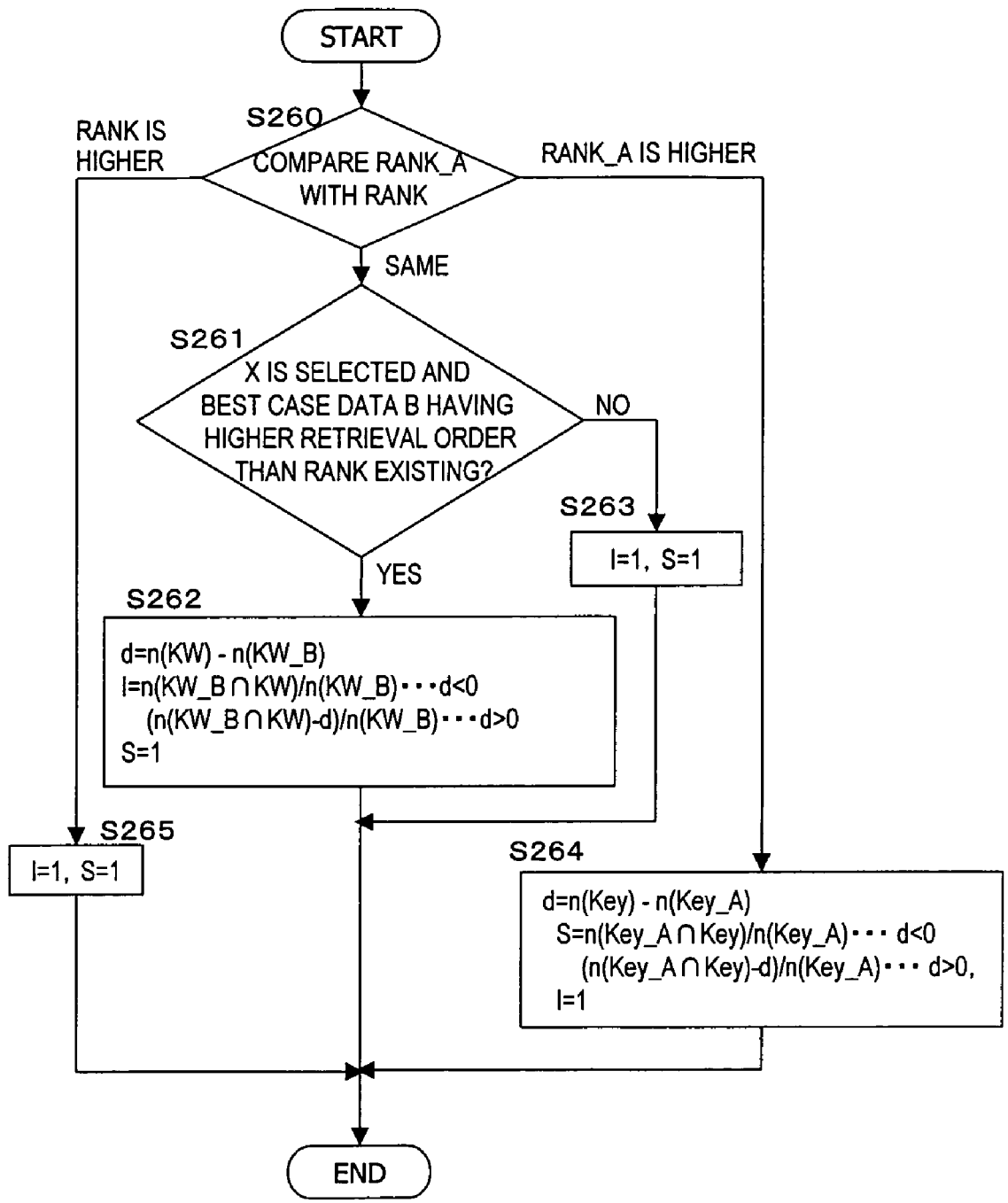
FIG. 24 shows a process flow of the normal determining process in step S252.

FIG. 24 shows the process flow of the normal determining process in step S252. The operator skill determination unit 121 compares the best order Rank_A of the best case data A with the order Rank of the retrieval history data 30 (step S260). If the best order Rank_A is the same as the order Rank, it is determined whether or not there is another best case data B in the best case data storage unit 28 having the selection target document ID (x) selected and having higher retrieval result than the order Rank of the selection target document x (step S261).

When there is another best case data B (YES in step S261), then the difference d between the number n (KW_B) of the expressions of the keywords of the best case data B and the number n (KW) of the expressions of the keyword 33 obtained before retrieval is obtained. The value of the information acquisition skill point I is I=n (KW_B∩KW)/n (KW_B) when d<0, and I=(n (KW_B∩KW)−d)/n (KW_B) when d>0. The value of the retrieval key selection skill point S is S=1 (step S262). When there is no another best case data B (NO in step 261), the value of the information acquisition skill point I is I=1, and the value of the retrieval key selection skill point S is S=1 (step S263).

In step S260, when the best order Rank_A is higher than the order Rank, the difference d between the number n (Key_A) of the expressions of the retrieval key of the best case data A and the number n (Key) of the expressions of the retrieval key of the retrieval history data 30 is obtained, and the value of the retrieval key selection skill point S is set to S=n(Key_A∩Key)/n (Key_A) when d<0, and S=(n Key_A∩Key)−d/n (Key_A) when d>0. The value of the information acquisition skill point I is I=1 (step S264).

In step S260, when the order Rank is higher than the best order Rank_A, the value of the information acquisition skill point I=1 and the value of the retrieval key selection skill point S is S=1 (step S265).

Figure 25:
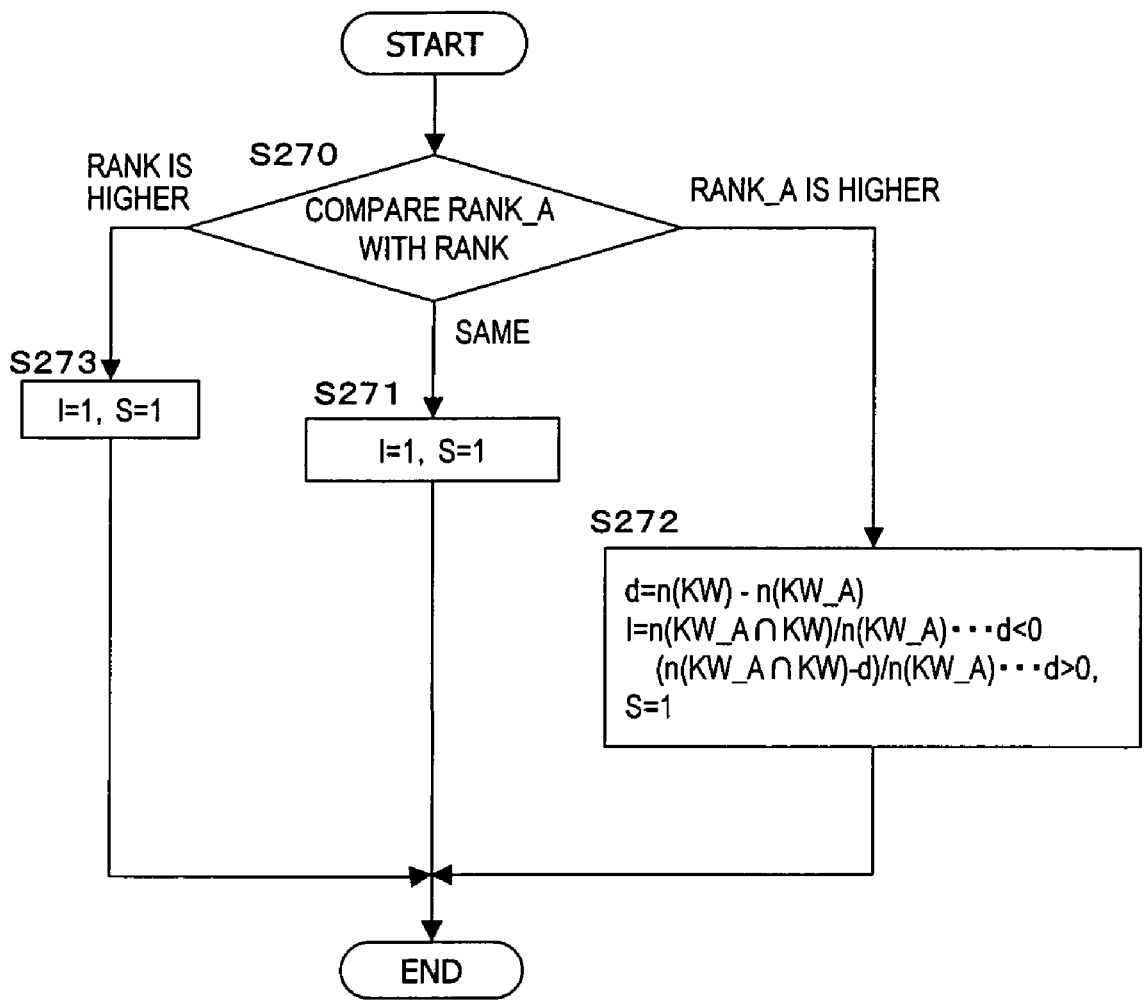
FIG. 25 shows a process flow of the determining process when a close best case data is acquired in step S254.

FIG. 25 shows the process flow of the determining process when the close best case data is obtained in step S254.

The operator skill determination unit 121 compares the best order Rank_A of the best case data A with the order Rank of the selection target document x of the retrieval history data 30 (step S270). If the best order Rank_A is the same as the order Rank, the value of the information acquisition skill point I is I=1, and the value of the retrieval key selection skill point S is S=1 (step S271). When the best order Rank_A is higher than the order Rank, the difference d between the number n (KW_A) of the expressions of the keywords of the best case data A and the number n (KW) of the expressions of the keyword 33 obtained before retrieval is obtained, and the value of the information acquisition skill point I is I=n (Key_A∩KW)/n (KW_A) when d<0, and I=(n (Key_A∩KW)−d)/n (KW_A) when d>0. The value of the retrieval key selection skill point S=1 (step S272). When the order Rank is higher than the best order Rank_A, the information acquisition skill point I is I=1, and the value of the retrieval key selection skill point S is S=1 (step S273).

Figure 26:
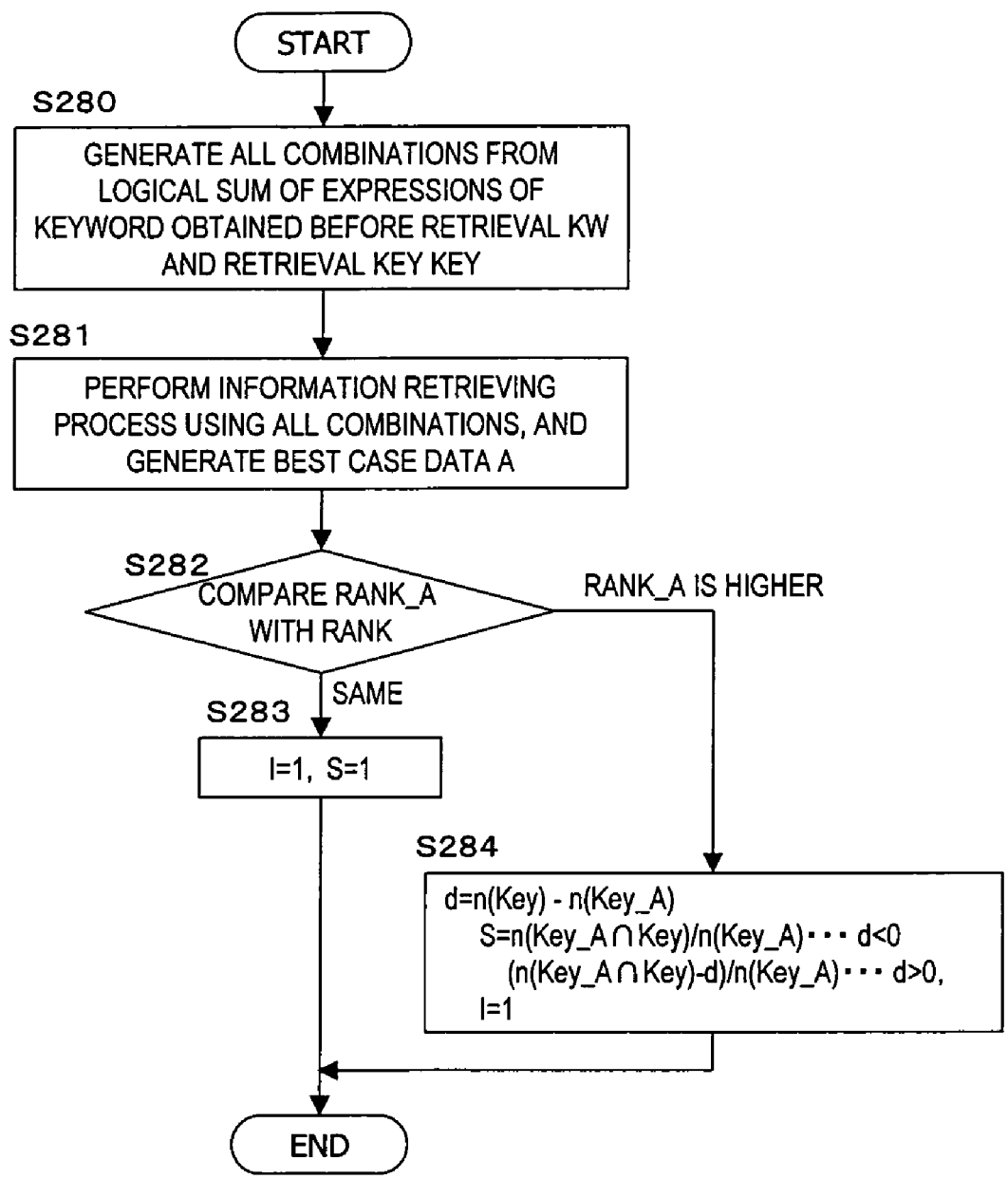
FIG. 26 shows a process flow of the determining process without best case in step S255.

FIG. 26 shows the process flow of the determining process without the best case in step S255.

The operator skill determination unit 121 generates combinations of all expressions from the logical sum of the expressions (keyword KW) of the keyword 33 obtained before retrieval and the expressions of the retrieval key Key of the retrieval history data 30 (step S280). The information retrieving process is performed using the combinations of all expressions as retrieval keys, and the best case data A is generated (step S281). The best case data generating process is performed as in the process shown in FIG. 17. Then, the best order Rank_A of the generated best case data A is compared with the order Rank of the selection target document ID (x) of the retrieval history data 30 corresponding to the data ID 35 (step S282).

If the best order Rank_A is the same as the order Rank, the value of the information acquisition skill point I is I=1, and the value of the retrieval key selection skill point S is S=1 (step S283). If the best order Rank_A is higher than the order Rank, the difference d between the number n (Key_A) of the expressions of the best case data A and the number n (Key) of the expressions of the retrieval key of the retrieval history data 30 is obtained, and the value of the retrieval key selection skill S is S=n (Key_A∩Key)/n (Key_A) when d<0, and S=(n (Key_A∩Key) d)/n (Key_A) when d>0. The value of the information acquisition skill point I is I=1 (step S284).

In the above-mentioned skill determining process, the information acquisition skill point I and the retrieval key selection skill point S can also be calculated by adding the information about the how many times the retrieving operations have been performed, that is, whether or not a narrowing process has been performed.

In the present embodiment, a desired retrieval result has not been obtained in the first case retrieval, an appropriate document is obtained in the second case retrieval, and the retrieval has been successfully performed. When there is a difference between the keyword at the retrieval and the keyword at the retrieval immediately before, it indicates that new information has been heard in the process of narrowing retrieval. Therefore, subtraction is performed on the information acquisition skill point I of the retrieval. For example, the retrieval operation index value i (since the retrieval operation=1 in the case of the second retrieval, the index value i=1) and the subtraction coefficient α are set, and i ×α is subtracted from the obtained information acquisition skill point I.

Thus, the present invention is explained by referring to the embodiments, but it is obvious that the present invention can be varied within the scope of the gist of the present invention. For example, the information that can be informed in advance can be added to the retrieval key input by an operator in addition to the information obtained in the conversation with a client. Thus, if there is client information data prepared in advance when the keyword 33 obtained before retrieval is extracted from the voice data 32, then the expressions acquired from the client information relating to the retrieval (the name, the type name, etc. of the product of a client) can be added to the expressions of the keyword 33 obtained before retrieval extracted from the voice data 32.

For example, the keyword 33 obtained before retrieval cannot clearly indicate the context in which the expressions are used only by the expressions such as the "power supply, printing", etc. Therefore, the extraction can be performed not only by the expressions but also in the phrase such as "power is not connected", "printing cannot be performed", etc.

The present invention has been explained that the present invention can be embodied as a process program read and executed by the computer, but the process program for realizing the present invention can be stored in a computer-readable portable medium memory, semiconductor memory, a hard disk, etc. that are appropriate recording media, provided in these recording media, or provided by transmitting and receiving over various communication networks through a communication interface.

The features of the aspects and embodiments of the present invention are listed below.

What is claimed is:

1. A computer system for determining applicability of information retrieving processes, comprising:
    a first computer storage for storing keywords indicating necessary information for an information retrieving process;
    a second computer storage for storing past retrieval case data including expressions extracted from voice data associated with an operation of the information retrieving process that matches the stored keywords in the first computer storage, an identification of a document selected in the operation of the information retrieving process, an order of the selected document by the operation of the information retrieving process that represents a highest place in ranking among retrieval results of operations of the information retrieving processes performed in a certain period, and a set of retrieval keys used in the operation of the information retrieving process in which the selected document was retrieved with a best order;
    a third computer storage for storing the voice data associated with the operation of the information retrieving process recorded in a conversation between a customer and an operator, wherein the stored voice data includes information necessary for performing the operation of the information retrieving process;
    a fourth computer storage for storing retrieval history information from the operation of the information retrieving process, wherein the stored retrieval history information includes an identification of the operator performing the operation of the information retrieving process, a set of retrieval keys actually used in the operation of the information retrieving process, an identification of a document selected by the operator among retrieval results of the operation of the information retrieving process, and an order of the selected document representing a place of the selected document in ranking of retrieval results of the operation of the information retrieving process;
    a retrieval history information acquirer for acquiring the stored retrieval history information of the operation of the information retrieving process performed by the operator from the fourth computer storage;
    a voice data acquirer for acquiring the stored voice data from the third computer storage associated with the acquired stored retrieval history information;
    an extractor for extracting one or more expressions matching the stored keywords in the first computer storage from the acquired stored voice data;
    a retrieval applicability determiner for extracting the stored past retrieval case data from the second computer storage having expressions that partially correspond to the extracted one or more expressions;
    comparing the set of retrieval keys and the order of the selected document in the acquired stored retrieval history information to a set of best retrieval keys and a best order of the selected document in the extracted stored past retrieval case data;
    determining an applicability of the operation of the information retrieving process based on the comparing; and
    obtaining and outputting the determined applicability of the operation of the information retrieving process as an information retrieval skill of the operator.

2. The computer system according to claim 1, wherein the retrieval applicability determiner extracts the stored past retrieval case data further having an identification of the selected document identical to the identification of the selected document in the acquired stored retrieval history information; and
    comparing the set of retrieval keys to the set of best retrieval keys and the order of the selected document to the best order of the same selected document, and determining the applicability of the operation of the information retrieving process based on the comparing.

3. The computer system according to claim 1, wherein when there exists no stored past retrieval case data having both an expression and the identification of the document selected that correspond to one of the expressions and the identification of the document selected in the stored retrieval history information, the retrieval applicability determiner acquires stored past retrieval case data having the same identification of the document selected in the acquired stored retrieval history information.

4. The computer system according to claim 1, comprising:
    a best case generator for generating past retrieval case data with the set of retrieval keys, the identification of the document selected, the order of the selected document in the stored retrieval history information of the operation of the information retrieval process, and the extracted expressions from the voice data associated with the operation of the information retrieving process, and storing the generated past retrieval case data in the second computer storage.

5. The computer system according to claim 1, further comprising:
generating and storing the past retrieval case data based on the retrieval history information.

6. The computer system according to claim 1, further comprising:
selecting the expressions from the extracted stored past retrieval case data and displaying the selected expressions to a call operator at work.

7. The computer system according to claim 1, wherein
the retrieval applicability determiner determines the applicability of the operation of the information retrieving process based on differences between the set of retrieval keys and the set of best retrieval keys and between the order of the selected document and the best order as the result of the comparing.

8. The computer system according to claim 7, wherein, when the order of the selected document is the same as the best order of the selected document, the retrieval applicability determiner provides a certain value to the applicability of the operation of the information retrieving process based on a difference in number of keys between the set of retrieval keys and the set of best retrieval keys.

9. The computer system according to claim 1, further comprising:
a second extractor for extracting an expression corresponding to one of the stored keywords in the first computer storage from the voice data associated with the operation of the information retrieving process recorded in the conversation and acquired in real-time;
a best case retriever for extracting all the extracted stored past retrieval case data that has expressions corresponding to the extracted one or more expressions from the second computer storage; and
a best retrieval key candidate presenter for generating retrieval key candidate information including the best retrieval keys, the identification of the document selected and the best order of the selected document which are extracted from the extracted stored past retrieval case data, and displaying the generated retrieval key candidate information.

10. A method executed by a computer having a first computer storage, a second computer storage, a third computer storage, and a fourth computer storage for determining applicability of information retrieving processes, the method comprising:
storing keywords indicating necessary information for an information retrieving process in the first computer storage;
acquiring retrieval history information of an operation of the information retrieving process performed by an operator from the fourth computer storage, wherein the fourth computer storage stores retrieval history information of the operation of the information retrieving process, which includes an identification of the operator performing the operation of the information retrieving process, a set of retrieval keys actually used in the operation of the information retrieving process, an identification of a document selected by the operator among retrieval results of the operation of the information retrieving process, and an order of the selected document representing a place of the selected document in ranking of retrieval results of the operation of the information retrieving process;
acquiring voice data associated with the acquired retrieval history information from the third computer storage, wherein the third computer storage stores the voice data associated with the operation of the information retrieving process recorded in a conversation between a customer and the operator, wherein the stored voice data includes information necessary for performing the operation of the information retrieving process;
extracting one or more expressions corresponding to the stored keywords in the first computer storage from the acquired voice data;
extracting past retrieval case data having expressions that partially correspond to the extracted one or more expressions from the second computer storage, wherein the second computer storage stores the past retrieval case data, wherein the stored past retrieval case data includes expressions extracted from the voice data associated with the operation of the information retrieving process that matches the stored keywords in the first computer storage, an identification of a document selected in the operation of the information retrieving process, an order of the selected document by the operation of the information retrieving process that represents a highest place in ranking among retrieval results of operations of the information retrieving processes performed in a certain period, and a set of retrieval keys used in the operation of the information retrieving process in which the selected document was retrieved with a best order;
comparing the set of retrieval keys and the order of the selected document in the acquired retrieval history information to a set of best retrieval keys and a best order of the selected document in the extracted past retrieval case data;
determining an applicability of the operation of the information retrieving process based on the comparing; and
obtaining and outputting the determined applicability of the operation of the information retrieving process as an information retrieval skill of the operator.

11. The method according to claim 10, wherein
in the extracting the past retrieval case data, wherein the past retrieval case data further having an identification of the selected document identical to the identification of the selected document in the acquired retrieval history information is acquired; and
in the comparing, the set of retrieval keys to the set of best retrieval keys and the order of the selected document to the best order of the same selected document are compared.

12. The method according to claim 10, wherein
in the extracting the past retrieval case data, when there exists no past retrieval case data having both an expression and the identification of the document selected that correspond to one of the expressions and the identification of the document selected in the retrieval history information, the past retrieval case data having the same identification of the document selected in the acquired retrieval history information is acquired.

13. The method according to claim 10, further comprising:
generating past retrieval case data with the set of retrieval keys, the identification of the document selected in the operation of the information retrieving process, the order of the selected document in the retrieval history information of the operation of the information retrieval process, and the extracted expressions from the voice data associated with the operation of the information retrieving process; and storing the generated past retrieval case data in the second computer storage.

14. The method according to claim 10, further comprising:

extracting an expression corresponding to one of the stored keywords in the first computer storage from the voice data associated with the operation of the information retrieving process recorded the conversation and acquired in real-time;

extracting all the extracted past retrieval case data that has expressions corresponding to the extracted one or more expressions from the second computer storage;

generating retrieval key candidate information including the best retrieval keys, the identification of the document selected and the best order of the selected document which are extracted from the extracted past retrieval case data; and displaying the generated retrieval key candidate information.

* * * * *